United States Patent
Sakai et al.

(10) Patent No.: US 9,131,230 B2
(45) Date of Patent: Sep. 8, 2015

(54) THREE-DIMENSIONAL IMAGE OUTPUT DEVICE, THREE-DIMENSIONAL IMAGE OUTPUT METHOD, THREE-DIMENSIONAL IMAGE DISPLAY DEVICE, AND COMPUTER READABLE RECORDING MEDIUM

(75) Inventors: Toshihiko Sakai, Osaka (JP); Takayuki Naka, Osaka (JP); Tetsuya Hayashi, Osaka (JP); Noboru Iwata, Osaka (JP); Takashi Arimoto, Osaka (JP); Hideharu Tajima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 957 days.

(21) Appl. No.: 13/279,816

(22) Filed: Oct. 24, 2011

(65) Prior Publication Data

US 2012/0105445 A1  May 3, 2012

(30) Foreign Application Priority Data

Oct. 28, 2010  (JP) ................................ 2010-242699

(51) Int. Cl.
*G06T 15/00* (2011.01)
*H04N 13/04* (2006.01)
*G06T 15/10* (2011.01)
*G06T 17/20* (2006.01)
*G06T 19/00* (2011.01)
(Continued)

(52) U.S. Cl.
CPC ....... *H04N 13/0452* (2013.01); *H04N 13/0456* (2013.01); *G06T 15/00* (2013.01); *G06T 15/10* (2013.01); *G06T 17/00* (2013.01); *G06T 17/20* (2013.01); *G06T 19/00* (2013.01); *H04N 13/004* (2013.01)

(58) Field of Classification Search
CPC ......... G06T 19/00; G06T 17/20; G06T 17/00; G06T 15/10; G06T 15/00
USPC ............. 345/158, 163, 42, 49, 420, 419, 424, 345/421; 348/565, 581, 43, 51, 58; 382/154, 162, 167, 132, 128, 205
See application file for complete search history.

(56) References Cited

U.S. PATENT DOCUMENTS 6,005,607 A    12/1999  Uomori et al.
6,175,379 B1    1/2001  Uomori et al.
(Continued)

FOREIGN PATENT DOCUMENTS

JP    9-074573 A    3/1997
JP    2001-204738 A    7/2001
(Continued)

OTHER PUBLICATIONS

3D Safety Guidelines for Popularization of Human-Friendly 3D (revised on Apr. 20, 2010), the 3D Consortium (3DC) Safety Guideline Section.

*Primary Examiner* — Abderrahim Merouan
(74) *Attorney, Agent, or Firm* — Keating & Bennett, LLP

(57) ABSTRACT

A three-dimensional image output device of the present invention includes a display control section for, in a case where a plurality of three-dimensional effects are set for initial sub-image data for displaying a three-dimensional image to be displayed in the sub-window, supplying, to the display device, a plurality of sub-image data, which are the initial sub-image data for which the respective plurality of three-dimensional effects are set, so that a plurality of three-dimensional images which use the respective plurality of sub-image data are displayed on the display screen.

1 Claim, 10 Drawing Sheets

(51) Int. Cl.
    *G06T 17/00*   (2006.01)
    *H04N 13/00*   (2006.01)

(56) References Cited

U.S. PATENT DOCUMENTS

| | | | |
|---|---|---|---|
| 6,268,880 B1 | 7/2001 | Uomori et al. | |
| 7,496,277 B2* | 2/2009 | Ackley et al. | 386/248 |
| 7,570,385 B2* | 8/2009 | Okutsu et al. | 358/1.18 |
| 7,898,578 B2* | 3/2011 | Nakamura | 348/231.3 |
| 8,120,605 B2* | 2/2012 | Lee et al. | 345/419 |
| 8,230,041 B2* | 7/2012 | Minowa et al. | 709/218 |
| 8,565,516 B2* | 10/2013 | Morifuji et al. | 382/154 |
| 2001/0033327 A1 | 10/2001 | Uomori et al. | |
| 2002/0024592 A1 | 2/2002 | Uomori et al. | |
| 2002/0055922 A1* | 5/2002 | Minowa et al. | 707/9 |
| 2005/0065679 A1* | 3/2005 | Kawauchi et al. | 701/29 |
| 2005/0089212 A1 | 4/2005 | Mashitani et al. | |
| 2005/0238224 A1* | 10/2005 | Okutsu et al. | 382/154 |
| 2005/0248561 A1* | 11/2005 | Ito et al. | 345/419 |
| 2005/0259147 A1* | 11/2005 | Nam et al. | 348/43 |
| 2006/0072175 A1* | 4/2006 | Oshino | 358/537 |
| 2006/0139448 A1* | 6/2006 | Ha et al. | 348/51 |
| 2007/0033230 A1* | 2/2007 | Minowa et al. | 707/104.1 |
| 2007/0255756 A1* | 11/2007 | Satomura et al. | 707/104.1 |
| 2007/0270993 A1* | 11/2007 | Onoshita et al. | 700/117 |
| 2008/0062069 A1* | 3/2008 | Sinclair et al. | 345/8 |
| 2008/0152214 A1* | 6/2008 | Sawachi | 382/154 |
| 2008/0158346 A1* | 7/2008 | Okamoto et al. | 348/47 |
| 2008/0252639 A1 | 10/2008 | Ijzerman et al. | |
| 2009/0041338 A1* | 2/2009 | Sawachi | 382/154 |
| 2009/0141024 A1* | 6/2009 | Lee et al. | 345/420 |
| 2009/0244262 A1 | 10/2009 | Masuda et al. | |
| 2009/0313564 A1* | 12/2009 | Rottler et al. | 715/764 |
| 2010/0103318 A1* | 4/2010 | Wang et al. | 348/565 |
| 2010/0150247 A1* | 6/2010 | Kim | 375/240.25 |
| 2010/0178027 A1* | 7/2010 | Park et al. | 386/68 |
| 2010/0201879 A1* | 8/2010 | VanDuyn et al. | 348/565 |
| 2010/0265315 A1* | 10/2010 | Okuda et al. | 348/43 |
| 2011/0090217 A1 | 4/2011 | Mashitani et al. | |
| 2011/0096155 A1* | 4/2011 | Choo et al. | 348/58 |
| 2011/0102321 A1* | 5/2011 | Son | 345/158 |
| 2011/0102427 A1 | 5/2011 | Mashitani et al. | |
| 2011/0102428 A1 | 5/2011 | Mashitani et al. | |
| 2011/0103680 A1 | 5/2011 | Mashitani et al. | |
| 2011/0109619 A1* | 5/2011 | Yoo et al. | 345/419 |
| 2011/0157173 A1 | 6/2011 | Mashitani et al. | |
| 2011/0157174 A1 | 6/2011 | Mashitani et al. | |
| 2011/0157319 A1 | 6/2011 | Mashitani et al. | |
| 2011/0193861 A1 | 8/2011 | Mashitani et al. | |
| 2012/0020640 A1* | 1/2012 | Uchimura | 386/230 |
| 2012/0044249 A1 | 2/2012 | Mashitani et al. | |
| 2012/0081515 A1* | 4/2012 | Jang | 348/43 |
| 2012/0257025 A1* | 10/2012 | Kim et al. | 348/51 |

FOREIGN PATENT DOCUMENTS

| | | |
|---|---|---|
| JP | 2004-007396 A | 1/2004 |
| JP | 2006-13618 A | 1/2006 |
| JP | 2006-115151 A | 4/2006 |
| JP | 2008-167066 A | 7/2008 |
| JP | 2009-510508 A | 3/2009 |
| JP | 2009-244502 A | 10/2009 |
| JP | 2010-114549 A | 5/2010 |
| JP | 2011-124802 A | 6/2011 |
| WO | WO-2011/162037 A1 | 12/2011 |

* cited by examiner

THREE-DIMENSIONAL IMAGE OUTPUT DEVICE, THREE-DIMENSIONAL IMAGE OUTPUT METHOD, THREE-DIMENSIONAL IMAGE DISPLAY DEVICE, AND COMPUTER READABLE RECORDING MEDIUM

This Nonprovisional application claims priority under 35 U.S.C. §119(a) on Patent Application No. 2010-242699 filed in Japan on Oct. 28, 2010, the entire contents of which are hereby incorporated by reference.

TECHNICAL FIELD

The present invention relates to a three-dimensional image output device, a three-dimensional image output method, a three-dimensional display device, and a computer readable recording medium, each of which is for allowing a three-dimensional image having a three-dimensional effect suitable for a viewer to be displayed in a small window which is placed inside another window.

BACKGROUND ART

In recent years, there have been rapid advancements in technology for enabling stereoscopic (three-dimensional) view, and three-dimensional image techniques are starting to become widespread use in movies and televisions. Basically, such three dimensional image techniques utilize binocular parallax which occurs due to spacing between left and right eyes. For example, it is possible to make a viewer see a three-dimensional image by separately displaying, as images exclusive for three-dimensional view, a right eye image and a left eye image so that the right eye image is perceived only by a right eye and the left eye image is perceived only by a left eye.

By the way, according to "3DC Safety Guidelines (revised on Apr. 20, 2010)" set by the 3D Consortium (3DC) Safety Guideline Section, in a case where a viewer who is watching a three-dimensional image sees double or does not sense a three-dimensional effect very much, the viewer should stop watching the image immediately and check if settings of a display device and software are correct, and if the three-dimensional view is unsuccessful (e.g., the viewer sees double or feels a sense of strangeness) even after that, the viewer should stop watching the image.

According to the guidelines, this is because a user of a three-dimensional apparatus utilizing a binocular parallax can feel a three-dimensional effect only after two images from different viewpoints, i.e., right and left eyes are combined in the brain of the user, and if the system is adjusted improperly (e.g., misalignment between left and right optical axes, difference in size between left and right images, difference in color or luminance, misalignment between left and right images in a top-to-bottom direction, mixture of light of a left image and light of a right image (large crosstalk)), the left image and the right image do not combine well, and therefore the user sees double or feels a sense of strangeness, and may suffer eyestrain.

Further, according to the guidelines, even if images to be given to left and right eyes are exchanged with each other, a user (viewer) generally does not notice the exchange contrary to expectation, but since this may cause eyestrain and discomfort, consideration should be given so that such exchange between right and left images does not occur.

In view of the circumstance, it is important to appropriately adjust a three-dimensional effect of a three-dimensional image viewed by a viewer so that the three-dimensional image with an appropriate three-dimensional effect can be viewed by the viewer.

As one means for allowing a viewer to view a three-dimensional image with an appropriate three-dimensional effect, it is very effective to allow the viewer himself to adjust the three-dimensional effect.

For example, Patent Literature 1 discloses an image quality adjustment apparatus which can be suitably applied to a television device and which allows a viewer to adjust an image quality.

This image quality adjustment apparatus allows a viewer to compare an image obtained before an image quality is changed and an image obtained after the image quality is changed. Thus, the viewer can adjust an image quality of an image.

Further, in recent years, a display technique called Picture In Picture is becoming popular. The Picture In Picture is a method of placing a small window inside another window so that a different content can be displayed in the small window. Examples of the Picture In Picture include (i) placing a small window on a corner of a television screen which is displaying a program of one channel so that another channel is displayed in the small window and (ii) displaying a small television image on a corner of a desktop screen of a personal computer.

For example, Patent Literature 2 discloses a navigation system for medical operation utilizing the Picture In Picture. According to this navigation system for medical operation, a position of operating equipment such as surgical instruments that are being used is displayed on biological image information displayed on a display section. This allows a doctor to find a direction in which the operation is performed.

In the Picture In Picture, in a case where a three-dimensional image is displayed on a small window that is displayed in another window, it is important to appropriately adjust a three-dimensional effect of the three-dimensional image viewed by a viewer so that the viewer can view the three-dimensional image with an appropriate three-dimensional effect, as described above.

CITATION LIST

Patent Literature 1

Japanese Patent Application Publication, Tokukai, No. 2006-13618 (Publication Date: Jan. 12, 2006)

Patent Literature 2

Japanese Patent Application Publication, Tokukai, No. 2001-204738 (Publication Data: Jul. 31, 2001)

SUMMARY OF INVENTION

Technical Problem

However, the image quality adjustment apparatus disclosed in Patent Literature 1 is not an apparatus for adjusting a three-dimensional image, but an apparatus for adjusting a two-dimensional image.

Further, since adjustment of an image quality of an image is utterly different from adjustment of a three-dimensional effect of a three-dimensional image, it is impossible to just apply the image quality adjustment apparatus to three-dimensional effect adjustment of a three-dimensional image.

Especially in the navigation system for medical operation disclosed in Patent Literature 1, a small window for displaying an enlarged image of a diseased part of a patient is displayed in a main image displaying an entire body of the patient. The image displayed in this small window is important for doctors and nurses who perform an operation. Accordingly, by making this image three-dimensional, it is possible to improve safety and efficiency of the operation.

If it is possible to appropriately adjust a three-dimensional effect of the enlarged image of the diseased part displayed on the small window so that the doctors and nurses can view a three-dimensional image of the diseased part with an appropriate three-dimensional effect as described above, it is possible to improve safety and efficiency of the operation.

In view of this, an object of the present invention is to provide a three-dimensional image output device, a three-dimensional image output method, a three-dimensional image display device, and a computer readable recording medium, each of which is for allowing a viewer to view, and compare images having different three-dimensional effects each of which images is displayed in a small window placed inside a window so that an image having an appropriate three-dimensional effect can be outputted.

Solution to Problem

In order to attain the object, a three-dimensional image output device of the present invention supplies image data to a display device so that one image is displayed in a main window and another image is displayed in a sub-window which is placed inside the main window on a display screen of the display device, includes: display control means for, in a case where a plurality of three-dimensional effects are set for initial sub-image data for displaying a three-dimensional image to be displayed in the sub-window, supplying, to the display device, a plurality of sub-image data, which are the initial sub-image data for which the respective three-dimensional effects are set, so that a plurality of three-dimensional images which use the respective plurality of sub-image data are displayed on the display screen.

The three-dimensional image output device is a three-dimensional image output device which supplies image data (entire image data) to a display device so that one image is displayed in a main window and another image is displayed in a sub-window that is placed inside the main window on a display screen of the display device. That is, the three-dimensional image output device is a three-dimensional image output device which realizes a Picture In Picture function.

According to the three-dimensional image output device, a plurality of three-dimensional sub-images using respective plurality of sub-image data which are initial sub-image data for which respective plurality of three-dimensional effects are set can be displayed on the display screen.

This allows a viewer who is watching the display screen to watch and compare the plurality of three-dimensional sub-images having different three-dimensional effects.

Accordingly, in a case where a small window is displayed inside a window and a three-dimensional image is displayed in the small window, a viewer is allowed to watch and compare sub-images using different three-dimensional effects so that a sub-image using an appropriate three-dimensional effect can be outputted.

A three-dimensional image output method of the present invention for supplying image data to a display device so that one image is displayed in a main window and another image is displayed in a sub-window which is placed inside the main window on a display screen of the display device, comprising the step of: in a case where a plurality of three-dimensional effects are set for initial sub-image data for displaying a three-dimensional image to be displayed in the sub-window, supplying, to the display device, a plurality of sub-image data which are the initial sub-image data for which the respective plurality of three-dimensional effects are set; and displaying, on the display screen, a plurality of three-dimensional images which use the respective plurality of sub-image data.

The three-dimensional image output method is a three-dimensional image output method for supplying image data (entire image data) to a display device so that one image is displayed in a main window and another image is displayed in a sub-window that is placed inside the main window on a display screen of the display device. That is, the three-dimensional image output method is a three-dimensional image output method which realizes a Picture In Picture function.

According to the three-dimensional image output method, a plurality of three-dimensional sub-images using respective plurality of sub-image data which are initial sub-image data for which respective plurality of three-dimensional effects are set can be displayed on the display screen.

This allows a viewer who is watching the display screen to watch and compare the plurality of three-dimensional sub-images having different three-dimensional effects.

Accordingly, in a case where a small window is displayed inside a window and a three-dimensional image is displayed in the small window, a viewer is allowed to watch and compare sub-images using different three-dimensional effects so that a sub-image using an appropriate three-dimensional effect can be outputted.

Advantageous Effects of Invention

As described above, the three-dimensional image output device of the present invention which supplies image data to a display device so that one image is displayed in a main window and another image is displayed in a sub-window which is placed inside the main window on a display screen of the display device, includes: display control means for, in a case where a plurality of three-dimensional effects are set for initial sub-image data for displaying a three-dimensional image to be displayed in the sub-window, supplying, to the display device, a plurality of sub-image data, which are the initial sub-image data for which the respective three-dimensional effects are set, so that a plurality of three-dimensional images which use the respective plurality of sub-image data are displayed on the display screen.

As described above, the three-dimensional image output method of the present invention for supplying image data to a display device so that one image is displayed in a main window and another image is displayed in a sub-window which is placed inside the main window on a display screen of the display device, includes the step of: in a case where a plurality of three-dimensional effects are set for initial sub-image data for displaying a three-dimensional image to be displayed in the sub-window, supplying, to the display device, a plurality of sub-image data, which are the initial sub-image data for which the respective plurality of three-dimensional effects are set, so that a plurality of three-dimensional images which use the respective plurality of sub-image data are displayed on the display screen.

Since a viewer is allowed to watch and compare images using different three-dimensional effects, an image using an appropriate three-dimensional effect can be outputted.

DESCRIPTION OF EMBODIMENTS

Embodiment 1

An embodiment of the present invention is described below with reference to FIGS. 1 through 6.

Figure 1:
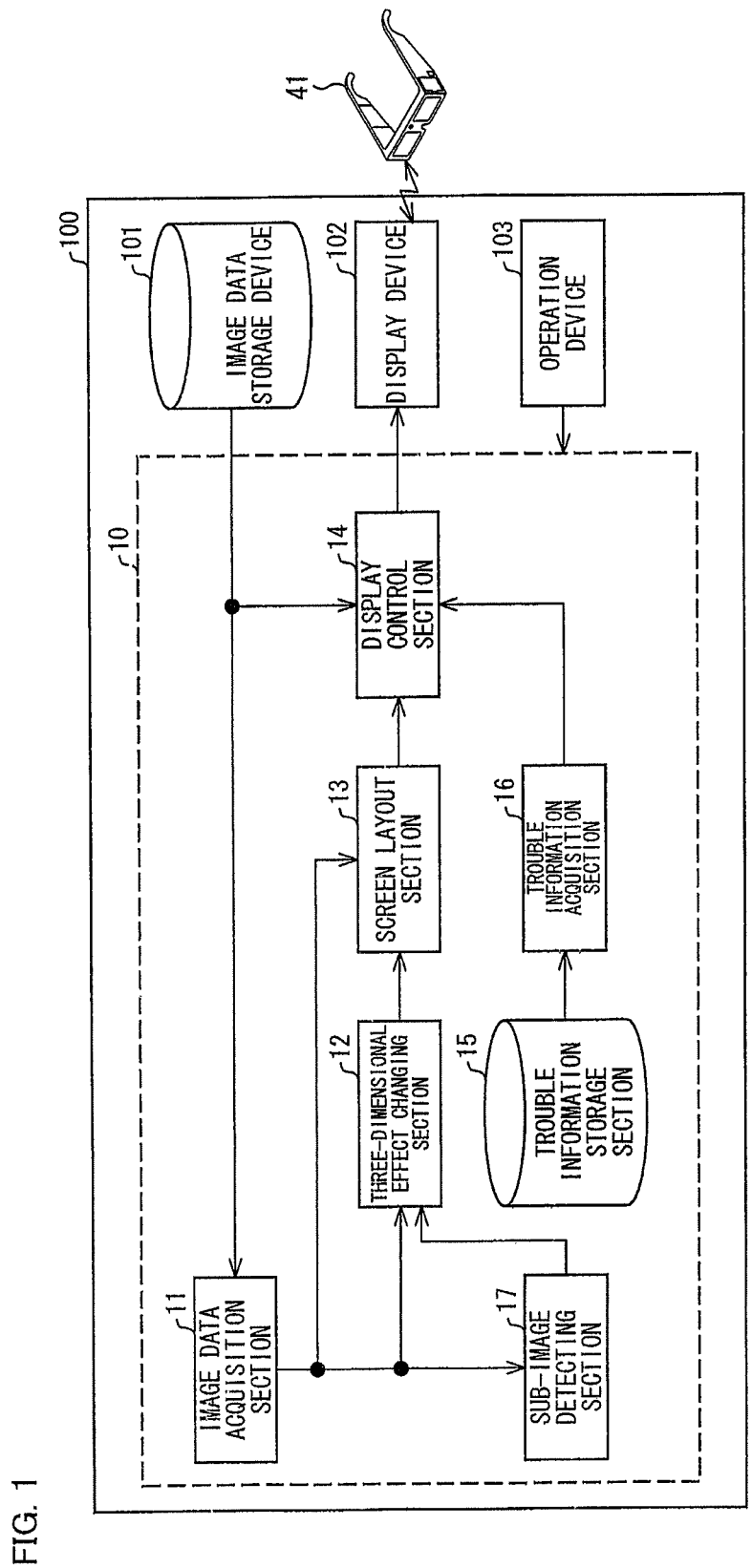
FIG. 1 is a block diagram illustrating an outline configuration of a three-dimensional image output device of an embodiment of the present invention.

FIG. 1 is a block diagram illustrating an outline configuration of a three-dimensional image output device 10 of Embodiment 1 of the present invention. The three-dimensional image output device 10 is mounted in a three-dimensional image display device 100 for displaying a three-dimensional image for a viewer. The three-dimensional image display device 100 displays, for a viewer, a three-dimensional image outputted by the three-dimensional image output device 10.

Of course, a device in which the three-dimensional image output device 10 is mounted is not limited to a three-dimensional image display device such as the three-dimensional image display device 100. For example, the three-dimensional image output device 10 may be mounted in a recording/reproducing apparatus for recording and reproducing a three-dimensional image. In a case where the three-dimensional image output device 10 is mounted in a recording/reproducing apparatus, the three-dimensional image output device 10 outputs a three-dimensional image with the use of image data that is recorded on a recording medium such as BD (Blu-Ray (Registered Trademark) Disc), DVD (Digital Versatile Disc) or HDD (Hard Disc Drive).

Further, the three-dimensional image output device 10 and the three-dimensional image display device 100 in which the three-dimensional image output device 10 is mounted can realize a display technique called Picture In Picture. As mentioned in Background Art, the Picture In Picture is a method of placing a small window inside a large window so that a content different from that of the large window can be displayed in the small window. Examples of the Picture In Picture include (i) placing a small window on a corner of a television screen which is displaying a program of one channel, and displaying another channel in the small window and (ii) displaying a small television image on a corner of a desktop screen of a personal computer.

In a case where a small window is placed inside a large window, the large window is hereinafter referred to as "main window", an image displayed in the "main window" is hereinafter referred to as "main image", the small window is hereinafter referred to as "sub-window", and an image displayed in the "sub-window" is hereinafter referred to as "sub-image".

The three-dimensional image output device 10 allows a viewer to watch and compare sub-images having different three-dimensional effects by causing each of the sub-images to be displayed in a sub-window which is displayed inside a main window. Thus, a three-dimensional image having an appropriate three-dimensional effect is outputted.

(Three-Dimensional Image Display Device 100)

As shown in FIG. 1, the three-dimensional image display device 100 includes an image data storage device (image data storage section) 101, a display device 102, and an operation device 103.

(Image Data Storage Device 101)

The image data storage device 101 stores image data that is necessary in a case where the three-dimensional image display device 100 displays a three-dimensional image. The image data storage device 101 acquires the image data via Internet or terrestrial digital broadcasting, and then stores the image data thus acquired. In a case where the three-dimensional image display device 100 is the one which can reproduce the recording medium as described above, image data read out from the recording medium may be stored in the image data storage device 101.

The image data is data in which data for a main image and data for a sub-image described above are multiplexed. In a three-dimensional image technique utilizing binocular parallax, the data for the main image and the data for the sub-image both include data for a right eye image to be viewed only by a right eye of a user (viewer in this case) and data for a left eye image to be viewed only by a left eye of the user. That is, both of the data for the main image and the data for the sub-image are unified image data in which the right eye image and the left eye image are combined. Note that the data for the main image and the data for the sub-image may be hereinafter referred to collectively as "entire image data".

Of course, both the main image and the sub-image do not need to be a three-dimensional image. For example, it is possible that only the sub-image is a three-dimensional image and the main image is a two-dimensional image. In the present invention, it is only necessary that the sub-image is a three-dimensional image. Note that the following description deals with an example in which both the data for the main image and the data for the sub-image are data for displaying a three-dimensional image. Note also that a two-dimensional image can be displayed by utilizing only the data for the right eye image or only the data for the left eye image, as described later.

The image data storage device 101 can be, for example, a magnetic disc device, such as a hard disc drive (hereinafter referred to as "HDD"), which can be increased in capacity.

(Display Device 102)

The display device 102 displays a three-dimensional image for a user (viewer in this case). Of course, the display device 102 can display a two-dimensional image, too. The display device 102 can be an LCD (liquid crystal display), a PDP (plasma display panel), or a CRT (cathode-ray tube) display.

Further, the display device 102 is capable of wirelessly communicating with shutter eyeglasses (e.g., liquid crystal shutter eyeglasses) 41 which the viewer wears when viewing a three-dimensional image. The display device 102 alternately displays the right eye image and the left eye image at a constant cycle. The shutter eyeglasses 41 wirelessly communicate with the display device 102, and switches a right eye liquid crystal shutter from a light-transmitting state to a light-blocking state or vise versa and switches a left eye liquid crystal shutter from a light-blocking state to a light-transmitting state or vise versa, in synchronization with timing of switching between the right eye image and the left eye image.

The viewer views the right eye image and the left eye image with respective different eyes through the shutter eyeglasses 41, and based on these images, the viewer can see a three-dimensional image.

Of course, the display device 102 may communicate with the shutter eyeglasses 41 via wire communication or the three-dimensional image display device 100 may separately include a communication device which is capable of wireless communication or wire communication with the shutter eyeglasses 41.

Further, the display device 102 is capable of displaying, on its screen, the main image and the sub-image described above at the same time. For example, in a case where a viewer instructs Picture In Picture display with the use of the operation device 103, the display device 102 displays, on its screen, the main image and the sub-image in response to the instruction.

(Operation Device 103)

In response to receipt of various kinds of instructions from a viewer, the operation device 103 outputs the instructions to sections of the three-dimensional image display device 100 and to the three-dimensional image output device 10. The operation device 103 is, for example, an input button, a switch, or the like. The operation device 103 may include a numeric keypad, keyboard, and the like.

(Three-Dimensional Image Output Device 10)

As shown in FIG. 1, the three-dimensional image output device 10 includes an image data acquisition section 11 for acquiring entire image data, a three-dimensional effect changing section (three-dimensional effect changing means) 12 for changing a three-dimensional effect of a three-dimensional image, a screen layout section 13 for determining the way in which three-dimensional images with different three-dimensional effects are arranged, a display control section (display control means) 14 for controlling display of a three-dimensional image, a trouble information storage section 15 for storing trouble information including estimated troubles concerning the three-dimensional image display device 100 and trouble shooting for those troubles, a trouble information acquisition section (trouble information acquisition means) 16 for acquiring the trouble information stored in the trouble information storage section 15, and a sub-image detecting section 17 (sub-image detecting means) for detecting a sub-image.

(Image Data Acquisition Section 11)

The image data acquisition section 11 acquires the entire image data stored in the image data storage device 101 of the three-dimensional image display device 100. When a viewer instructs the three-dimensional image display device 100 to adjust a three-dimensional effect (later described) with the use of the operation device 103, the image data acquisition section 11 executes the acquisition of the entire image data from the image data storage device 101 in response to the instruction.

The image data acquisition section 11 supplies the entire image data acquired from the image data storage device 101 to the three-dimensional effect changing section 12, the screen layout section 13, and the sub-image detecting section 17.

(Three-Dimensional Effect Changing Section 12)

The three-dimensional effect changing section 12 receives the entire image data from the image data acquisition section 11, and receives a result of sub-image detection from the sub-image detecting section 17.

As described above, the entire image data stored in the image data storage device 101 includes data for the main image and data for the sub-image (hereinafter referred to as "initial sub-image data"). The three-dimensional effect changing section 12 identifies the initial sub-image data which is contained in the entire image data received from the image data acquisition section 11 on the basis of the result of the detection of the sub-image detecting section 17.

After identifying the initial sub-image data, the three-dimensional effect changing section 12 detects a three-dimensional effect given to the initial sub-image data. This three-dimensional effect (hereinafter referred to as "initial three-dimensional effect") is a three-dimensional effect which a person who creates the initial sub-image data determines when creating the initial sub-image data. Normally, the display control section 14 of the three-dimensional image output device 10 outputs the initial sub-image data without altering the initial three-dimensional effect.

The following describes a three-dimensional effect described above with reference to FIG. 2. FIG. 2 is a diagram schematically explaining a three-dimensional effect. As described above, a three-dimensional image technique basically utilizes binocular parallax which occurs due to spacing between right and left eyes.

Figure 2A:
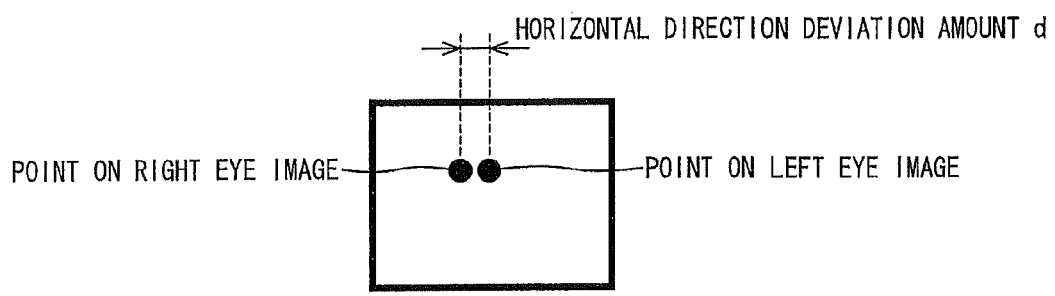
FIG. 2A is a diagram schematically explaining a three-dimensional effect.
Figure 2B:
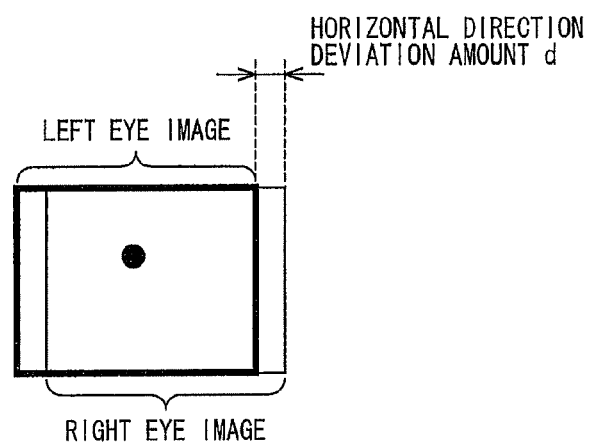
FIG. 2B is a diagram schematically explaining a three-dimensional effect.

As shown in FIG. 2A, in a case where a right eye image and a left eye image are caused to completely overlap each other, corresponding points of the two images are deviated from each other by a predetermined amount d (hereinafter referred to as "horizontal direction deviation amount d") in a horizontal direction. In other words, in a case where the right eye image and the left eye image are placed so as to deviate from each other by the horizontal direction deviation amount d as shown in FIG. 2B, the corresponding points of the two images coincide with each other.

In the present invention, a value of the horizontal direction deviation amount d is used as an indicator indicative of a three-dimensional effect. The three-dimensional image output device 10 changes a three-dimensional effect from the initial three-dimensional effect by increasing or decreasing the horizontal direction deviation amount d corresponding to the initial three-dimensional effect. Thus, the three-dimensional image output device 10 can output a three-dimensional image having a three-dimensional effect that is different from the initial three-dimensional effect.

Of course, the indicator indicative of a three-dimensional effect is not limited to a horizontal direction deviation amount d, and can be, for example, a difference in size between the right eye image and the left eye image. That is, the indicator indicative of a three-dimensional effect is not limited to a specific one, provided that it is an indicator which can indicate a three-dimensional effect that is different from an initial three-dimensional effect.

In the present invention, a two-dimensional image utilizes either the right eye image or the left eye image. The three-dimensional image output device 10 can also output a two-dimensional image by using the initial sub-image data in such a way.

In the three-dimensional effect changing section 12, a predetermined change amount, i.e., how much the horizontal direction deviation amount d is increased or decreased from the horizontal direction deviation amount d of the initial three-dimensional effect is determined in advance. For example, in a case where the horizontal direction deviation amount d is decreased, it is determined in advance that the horizontal direction deviation amount d is reduced to one-half of its original value, whereas in a case where the horizontal direction deviation amount d is increased, it is determined in advance that the horizontal direction deviation amount d is increased 1.5-fold.

Of course, "one-half" and "1.5-fold" are just examples. In conclusion, it is only necessary that the predetermined change amount is such that a viewer can recognize a difference in three-dimensional effect between a three-dimensional image using the initial three-dimensional effect and a three-dimensional image using a three-dimensional effect that has been changed as above. Needless to say, a viewer can easily recognize a difference in three-dimensional effect between a three-dimensional image and a two-dimensional image.

Thus, the three-dimensional effect changing section 12 increases or decreases the horizontal direction deviation amount d of the initial three-dimensional effect by a predetermined change amount. Then, the three-dimensional effect changing section 12 supplies, to the screen layout section 13, initial sub-image data (hereinafter referred to as "secondary sub-image data") whose horizontal direction deviation amount d has been increased or decreased by a predetermined change amount. The three-dimensional effect changing section 12 can supply, to the screen layout section 13, the result of the sub-image detection received from the sub-image detecting section 17 along with the secondary sub-image data.

(Screen Layout Section 13)

The screen layout section 13 receives the entire image data from the image data acquisition section 11, and receives the secondary sub-image data from the three-dimensional effect changing section 12. Further, the screen layout section 13 acquires, from the three-dimensional effect changing section 12, the result of sub-image detection of the sub-image detecting section 17, and then identifies initial sub-image data contained in the entire image data on the basis of the result.

The screen layout section 13 receives the secondary sub-image data, and identifies the initial sub-image data. After identifying the initial sub-image data, the screen layout section 13 determines a screen layout, i.e., how a plurality of sub-images (including a two-dimensional image, in this case) which respectively use the initial sub-image data and the secondary sub-image data and which have respective different three-dimensional effects are disposed on a screen (display screen) of the display device 102 of the three-dimensional image display device 100. Note that the three-dimensional image which uses the initial sub-image data is referred to as "initial three-dimensional sub-image", and the three-dimensional image which uses the secondary sub-image data is referred to as "secondary three-dimensional sub-image".

In the present embodiment, the three-dimensional effect changing section 12 changes the initial three-dimensional effect given to the initial sub-image data as described above, and the screen layout section 13 receives the initial sub-image data from the image data acquisition section 11 and receives the secondary sub-image data from the three-dimensional effect changing section 12. However, the present invention is not limited to this. For example, a plurality of three-dimensional effects may be given to the initial sub-image data in advance. Accordingly, the screen layout section 13 receives, from the image data acquisition section 11, a plurality of sub-image data which are initial sub-image data for which the plurality of three-dimensional effects are respectively set. In this case, it is unnecessary for the three-dimensional effect changing section 12 to change the initial three-dimensional effect.

For example, the initial sub-image data may be two kinds of test mode images (a two-dimensional image and a three-dimensional image, in this case) having different three-dimensional effects. As described later, by comparing the two kinds of test mode images, a viewer can check, before viewing a 3D content, whether or not there are any troubles with operation between 3D eyeglasses and a television or operation between the 3D eyeglasses and a recorder.

Specifically, it is only necessary that the screen layout section 13 determines positions and sizes (a horizontal length and a vertical length, in this case) of the initial three-dimensional sub-image and at least one secondary three-dimensional sub-image on the screen of the display device 102. For example, in the three-dimensional image technique utilizing the binocular parallax, it is preferable that the three-dimensional images are the same in horizontal position and horizontal length. The expression "same in horizontal position" means that the initial three-dimensional sub-image and the secondary three-dimensional sub-image are displayed so as to be adjacent in a vertical direction on the screen of the display device 102 which a viewer is watching. This allows the viewer to easily recognize a difference in three-dimensional effect between the initial three-dimensional sub-image and the secondary three-dimensional sub-image.

Of course, such a screen layout is just an example. In conclusion, the screen layout is not limited to a specific one, provided that a viewer can recognize the difference in three-dimensional effect. The screen layout section 13 is only required to determine a screen layout in accordance with a three-dimensional image technique used for the initial sub-image data and the secondary sub-image data.

The screen layout section 13 supplies screen layout information indicative of the screen layout thus determined to the display control section 14 along with the entire image data (containing the initial sub-image data) and the secondary sub-image data.

(Display Control Section 14)

The display control section 14 normally supplies the entire image data to the display device 102 of the three-dimensional image display device 100. The display control section 14 acquires the entire image data from the image data storage device 101 of the three-dimensional image display device 100 or from the screen layout section 13.

The display control section 14 has the Picture In Picture function. Specifically, after receiving the entire image data in which the data for the main image and the data for the sub-image are multiplexed, the display control section 14 supplies the entire image data to the display device 102 so that one image (i.e., main image) is displayed in a main window and another image (i.e., sub-image) is displayed in a sub-window which is placed inside the main window on the screen of the display device 102.

The display control section 14 acquires the entire image data directly from the image data storage device 101, unless the image data acquisition section 11 executes acquisition of the entire image data from the image data storage device 101.

In this case, as for the sub-image, the display control section 14 supplies, to the display device 102, the initial sub-image data using the initial three-dimensional effect without any change. The display control section 14 controls image display processing of the display device 102 so that the initial three-dimensional sub-image using the initial three-dimensional effect is displayed.

Meanwhile, in a case where the image data acquisition section 11 executes acquisition of the entire image data from the image data storage device 101, the display control section 14 receives the entire image data, the secondary sub-image data, and the screen layout information from the screen layout section 13 instead of acquiring the entire image data from the image data storage device 101.

In this case, as for the sub-image, the display control section 14 controls the image display processing of the display device 102 so that the initial three-dimensional sub-image and the secondary three-dimensional sub-image using the secondary three-dimensional effect are displayed at the same time in accordance with the screen layout indicated by the screen layout information received from the screen layout section 13.

In both cases, as for the main image, the display control section 14 supplies the data for the main image to the display device 102 without changing a three-dimensional effect given in advance to the data for the main image. The display control section 14 controls the image display processing of the display device 102 so that the main image using the three-dimensional effect given in advance is displayed.

(Trouble Information Storage Section 15)

The trouble information storage section 15 stores, in advance, trouble information indicative of troubles which can occur in the three-dimensional image display device 100 and the three-dimensional image output device 10 provided in the three-dimensional image display device 100 when a viewer wearing the shutter eyeglasses 41 views the sub-images displayed on the display device 102. In particular, it is preferable that the trouble information includes not only the troubles that are expected to occur in the three-dimensional image display device 100 and the three-dimensional image output device 10, but also actions (i.e., trouble shooting) which should be taken by a viewer to solve the troubles.

Such trouble information is read out from the trouble information storage section 15 by the trouble information acquisition section 16, and is then sent to the display control section 14.

Examples of the trouble information include "battery shut-off of eyeglasses (shutter eyeglasses 41, in this case)" and "out of synchronization on screen of television (the display device 102, in this case)". Trouble shooting for these troubles are "Please exchange battery for eyeglasses." and "Please adjust display state on the control panel provided on backside of the television".

(Trouble Information Acquisition Section 16)

The trouble information acquisition section 16 acquires the trouble information stored in the trouble information storage section 15. When a viewer gives an instruction indicating "occurrence of trouble" (later described) to the three-dimensional image display device 100 with the use of the operation device 103, the trouble information acquisition section 16 acquires the trouble information from the trouble information storage section 15 in response to the instruction.

The trouble information acquisition section 16 supplies, to the display control section 14, the trouble information acquired from the trouble information storage section 15, and the trouble information acquisition section 16 causes the display control section 14 to display the trouble information on the display device 102. Thus, the viewer can view the trouble information displayed on the display device 102 and carry out trouble shooting.

Note that after receiving the trouble information from the trouble information acquisition section 16, the display control section 14 causes the display device 102 to display the trouble information in replacement of an image previously displayed on the display device 102.

(Sub-Image Detecting Section 17)

After receiving the entire image data from the image data acquisition section 11, the sub-image detecting section 17 detects the initial sub-image data contained in the entire image data.

As described above, the entire image data stored in the image data storage device 101 contains the initial sub-image data and the data for the main image. Accordingly, in order to adjust the three-dimensional effect of the sub-image as described later, it is necessary to identify the data for the sub-image, i.e., the initial sub-image data contained in the entire image data.

On this account, the sub-image detecting section 17 detects the initial sub-image data contained in the entire image data, and supplies a result of the detection to the three-dimensional effect changing section 12.

Note that the data for the main image and the initial sub-image data that are contained in the entire image data are normally given respective different identifiers. For example, the sub-image detecting section 17 can detect the initial sub-image data contained in the entire image data with the use of such an identifier.

(Operation of Three-Dimensional Image Output Device 10)

Figure 4:
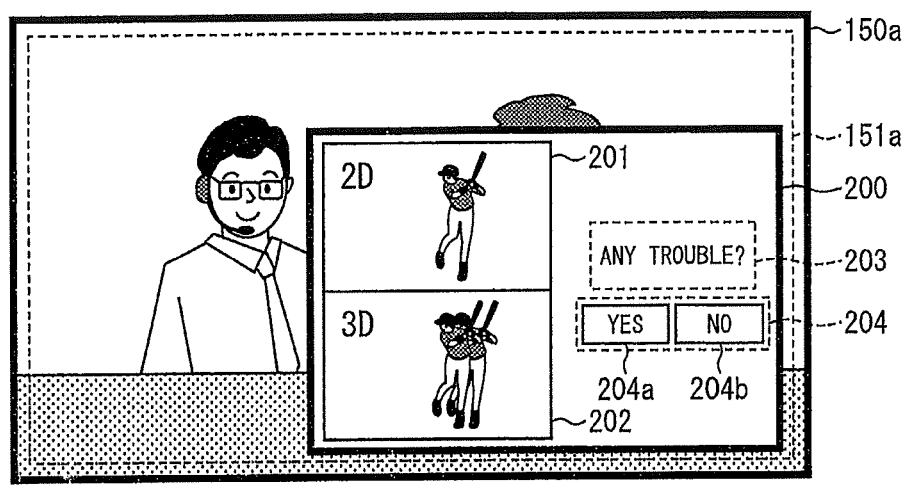
FIG. 4 is a diagram schematically explaining an operation of the three-dimensional image output device, and illustrates the screen of the display device.
Figure 5:
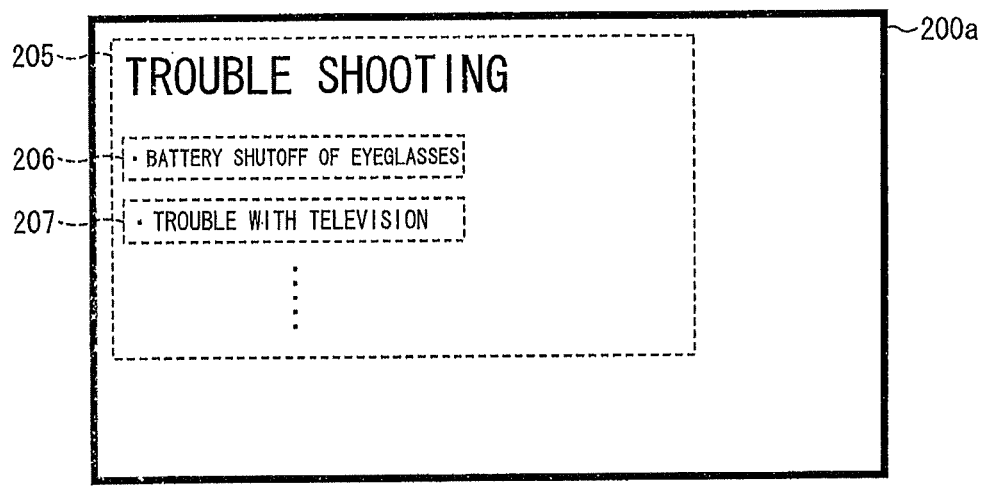
FIG. 5 is a diagram schematically explaining an operation of the three-dimensional image output device, and illustrates the screen of the display device.
Figure 6:
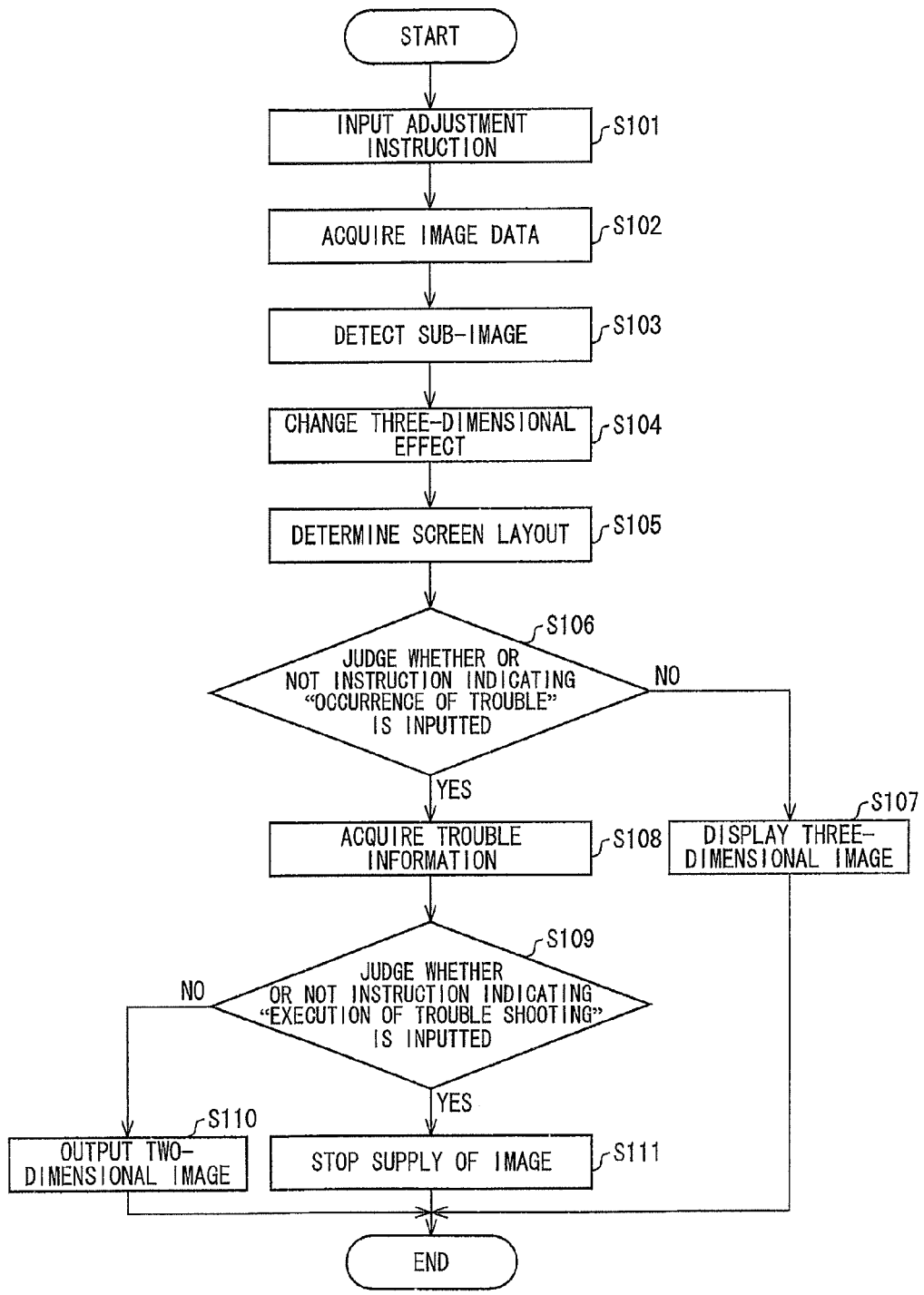
FIG. 6 is a flow chart showing an operation of the three-dimensional image output device.

The following describes operation of the three-dimensional image output device 10, i.e., processing procedure in the three-dimensional image output method, with reference to FIGS. 3A through 6. FIGS. 3A through 5 are diagrams schematically explaining the operation of the three-dimensional image output device 10 and each show the screen of the display device 102. FIG. 6 is a flow chart showing the operation of the three-dimensional image output device 10.

It is assumed that before the processes described below are carried out, the three-dimensional image output device 10 is outputting, to the display device 102 of the three-dimensional image display device 100, the entire image data stored in the image data storage device 101 without any change with the use of the display control section 14, and a viewer is watching the initial three-dimensional sub-image displayed on the display device 102 through the shutter eyeglasses 41. Of course, the viewer is also watching the main image displayed on the display device 102, but the following description focuses on the sub-image, and explanation of the main image is not given in particular unless needed.

As shown in FIG. 6, first, the viewer who is watching the initial three-dimensional sub-image inputs an instruction to adjust a three-dimensional effect of the initial three-dimensional sub-image with the use of the operation device 103 of the three-dimensional image display device 100 (Step S101). In Step S101, the viewer may input the instruction at a timing when the viewer starts watching the sub-image with the use of the three-dimensional image display device 100. Alternatively, the viewer may input the instruction anytime after start of viewing. In conclusion, the viewer may give the instruction when he or she thinks it necessary.

Next, when the instruction from the viewer is inputted via the operation device 103, the instruction is sent to the image data acquisition section 11 of the three-dimensional image output device 10. In response to receipt of the instruction, the image data acquisition section 11 acquires the entire image data stored in the image data storage device 101 of the three-dimensional image display device 100 (Step S102).

In Step S102, the instruction is also sent to the display control section 14 at the same time. In response to receipt of the instruction, the display control section stops outputting entire image data previously outputted to the display device 102. The display device 102 waits for new output from the display control section 14.

Further, the image data acquisition section 11 supplies the entire image data acquired from the image data storage device 101 to the three-dimensional effect changing section 12, the screen layout section 13, and the sub-image detecting section 17.

Next, after receiving the entire image data from the image data acquisition section 11, the sub-image detecting section 17 detects the initial sub-image data contained in the entire image data (Step S103). The sub-image detecting section 17 supplies a result of the detection to the three-dimensional effect changing section 12.

Next, the three-dimensional effect changing section 12 receives the entire image data from the image data acquisition section 11, and receives the result of the sub-image detection from the sub-image detecting section 17. Then, the three-dimensional effect changing section 12 identifies the initial sub-image data contained in the entire image data on the basis of the result of the sub-image detection, and detects and changes a three-dimensional effect (initial three-dimensional effect) given to the initial sub-image data (Step S104).

In Step S104, the three-dimensional effect is, for example, expressed by the above-mentioned indicator, i.e., a horizontal direction deviation amount d. The three-dimensional effect changing section 12 detects a horizontal direction deviation amount d of the initial three-dimensional effect of the initial sub-image data, and increases or decreases the horizontal direction deviation amount d of the initial three-dimensional effect by a predetermined change amount.

More specifically, in Step S104, the three-dimensional effect changing section 12 selects either the data for the right eye image or the data for the left eye image contained in the initial sub-image data. This selection means a change of a three-dimensional effect. The data for the right eye image and the data for the left eye image themselves are two-dimensional images. In other words, the data for the right eye image and the data for the left eye image both have zero three-dimensional effect. Therefore, even in the case where either the data for the right eye image or the data for the left eye image is selected, it can be said that the three-dimensional effect changing section 12 has changed the initial three-dimensional effect. The following description deals with a case where the three-dimensional effect, changing section 12 selects the data for the left eye image contained in the initial sub-image data. Of course, the three-dimensional effect changing section 12 may select the data for the right eye image.

The three-dimensional effect changing section 12 thus changes the initial three-dimensional effect to a secondary three-dimensional effect, and then supplies secondary sub-image data having the secondary three-dimensional effect to the screen layout section 13. Further, the three-dimensional effect changing section 12 transfers, to the screen layout section 13, the result of the sub-image detection received from the sub-image detecting section 17.

Next, the screen layout section 13 receives the entire image data (containing the initial sub-image data) from the image data acquisition section 11, and receives the secondary sub-image data from the three-dimensional effect changing section 12. The screen layout section 13 determines a screen layout, i.e., how a plurality of sub-images which respectively use the initial sub-image data and at least one secondary sub-image data and which have different three-dimensional effects are disposed on the screen of the display device 102 of the three-dimensional image display device 100 (Step S105).

More specifically, in Step S105, the screen layout section 13 receives, as the secondary sub-image data, the data for the left eye image from the three-dimensional effect changing section 12, as described above. As a result, the secondary three-dimensional sub-image is a two-dimensional image. Accordingly, the screen layout section 13 determines how the two-dimensional image and the initial three-dimensional sub-image are disposed on the screen of the display device 102, i.e., determines positions and sizes (in vertical and horizontal directions) of the two-dimensional image and the initial three-dimensional sub-image.

As described above, in the three-dimensional image technique utilizing the binocular parallax, it is preferable that the initial three-dimensional sub-image and the two-dimensional image are the same in horizontal position and horizontal length. The expression "same in horizontal position" means that the initial three-dimensional sub-image and the two-dimensional image are displayed so as to be adjacent in a vertical direction on the screen of the display device 102 which the viewer is watching. This allows the viewer to easily recognize a difference in three-dimensional effect between the initial three-dimensional sub-image and the two-dimensional image.

Figure 3A:
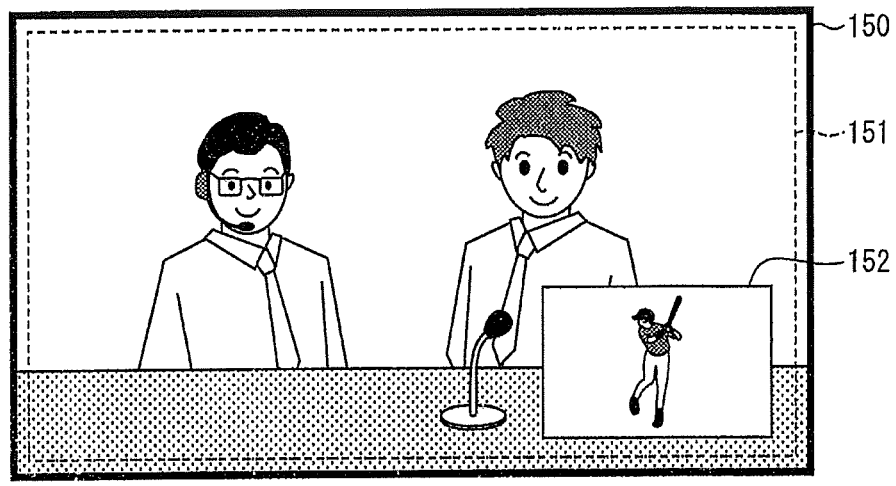
FIG. 3A is a diagram schematically explaining an operation of the three-dimensional image output device, and illustrates a screen of a display device.
Figure 3B:
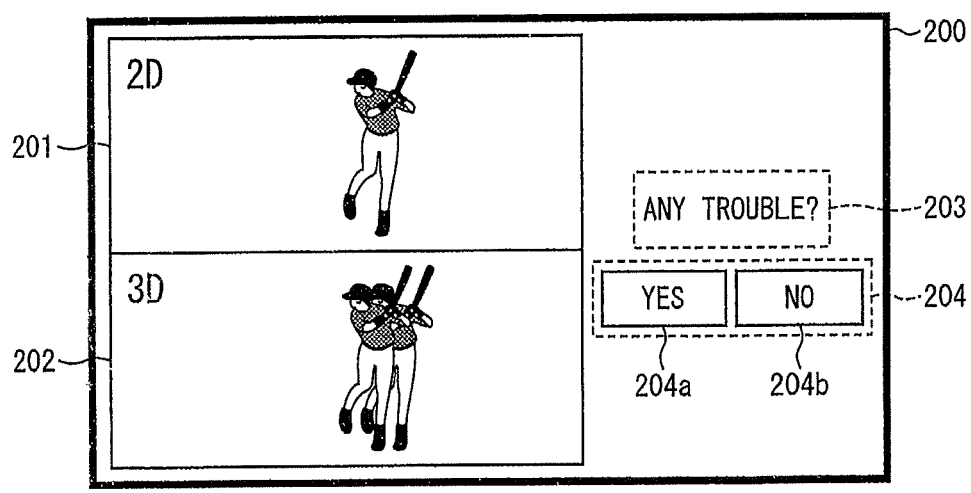
FIG. 3B is a diagram schematically explaining an operation of the three-dimensional image output device, and illustrates the screen of the display device.

For example, it is assumed that a main image 151 and a sub-image (initial three-dimensional sub-image) 152 are displayed on the screen 150 of the display device 102 as shown in FIG. 3A. In this case, a two-dimensional image 201 and an initial three-dimensional sub-image 202 are displayed in a region 200 which is a part of the screen 150 of the display device 102 as shown in FIG. 3B. In a case where the two-dimensional image 201 and the initial three-dimensional sub-image 202 are displayed, it is preferable that both the two-dimensional image 201 and the initial three-dimensional sub-image 202 have the same size as the initial three-dimensional sub-image 152 which is displayed before the two-dimensional image 201 is displayed. In this way, a viewer can compare the two-dimensional image 201 and the initial three-dimensional sub-image 202 under a circumstance close to an actual viewing circumstance in which the viewer watches only the initial three-dimensional sub-image 152 as a sub-image as shown in FIG. 3A.

Note that, for easy understanding of the drawings, the initial three-dimensional sub-image 152 of FIG. 3A and the initial three-dimensional sub-image 202 of FIG. 3B are illustrated in different sizes. In fact, however, the two-dimensional image 201 and the initial three-dimensional sub-image 202 each having the same size as the initial three-dimensional sub-image 152 of FIG. 3A are displayed on a screen 150*a* of the display device 102, as shown in FIG. 4.

Further, the screen layout section 13 not only determines the positions and the sizes of the two images in the region 200, but also determines (i) position and size of a question dialogue box 203 for inquiring of the viewer whether or not there is a trouble and (ii) position and size of an instruction input dialogue box 204 for allowing the viewer to input an instruction as to whether or not there is a trouble with the use of the operation device 103 as shown in FIG. 3B. The question dialogue box 203 and the instruction input dialogue box 204 are displayed in the region 200 which is a part of the screen 150 of the display device 102 along with the two-dimensional image 201 and the initial three-dimensional sub-image 202. In the instruction input dialogue box 204, a YES button 204a and a NO button 204b are displayed.

The screen layout section 13 supplies, to the display control section 14, screen layout information indicative of the screen layout as shown in FIG. 3B along with the entire image data (containing initial sub-image data) and the data for the left eye image contained in the initial sub-image data.

Next, the display control section 14 controls image display processing of the display device 102 so that the two-dimensional image 201 and the initial three-dimensional sub-image 202 are displayed concurrently in accordance with the screen layout indicated by the screen layout information which is received from the screen layout section 13. The viewer views the region 200 (see FIG. 3B) of the screen of the display device 102 and compares the two-dimensional image 201 and the initial three-dimensional sub-image 202. The viewer thus judges whether or not there is a trouble (e.g., the viewer sees double or does not feel a three-dimensional effect well in the initial three-dimensional sub-image 202) (Step S106).

In the conventional arts, even if there is a trouble such as an insufficient three-dimensional effect or a blur in an image displaying a content, it is difficult for a viewer who watches only the initial three-dimensional sub-image 202 to recognize the trouble.

In contrast, according to the three-dimensional image output device 10, a viewer can compare an initial three-dimensional sub-image and a secondary three-dimensional sub-image (a two-dimensional image, in this case) using a three-dimensional effect different from that of the initial three-dimensional sub-image as described above, and therefore can easily recognize the trouble. Thus, an image using an appropriate three-dimensional effect can be outputted. Consequently, the viewer can watch the image using the appropriate three-dimensional effect.

For example, the viewer inputs an instruction indicating "no trouble" by using the instruction input dialogue box 204 in response to the question in the question dialogue box 203 in FIG. 3B ("NO" in, Step S106). That is, the NO button 204b is selected. In this case, the display control section 14 receives the instruction, acquires the entire image data again directly from the image data storage device 101, and supplies the entire image data to the display device 102. Then, the display control section 14 controls the image display processing of the display device 102 so that the initial three-dimensional sub-image using the initial three-dimensional effect is displayed (Step S107).

Meanwhile, the viewer inputs an instruction indicating "occurrence of trouble" by using the instruction input dialogue box 204 in response to the question in the question dialogue box 203 ("YES" in Step S106). That is, the YES button 204a is selected. In this case, the trouble information acquisition section 16 receives the instruction, and acquires trouble information from the trouble information storage section 15 (Step S108).

In Step S108, the trouble information acquisition section 16 supplies the trouble information to the display control section 14. The display control section 14 controls the image display processing of the display device 102 so that the trouble information is displayed.

For example, as shown in FIG. 5, a trouble information dialogue box 205 for presenting the trouble information can be displayed on a region 200a which is a part of the screen of the display device 102. In the trouble information dialogue box 205, the troubles such as "eyeglasses battery shutoff" 206 and "trouble with television" 207 are listed.

In a case where the viewer performs trouble shooting with respect to any of the troubles by using the trouble information dialogue box 205, the viewer inputs an instruction indicating "execution of trouble shooting" with respect to the trouble with the use of the operation device 103 ("YES" in Step S109).

In this case, trouble shooting for solving the trouble which is the target of "execution of trouble shooting" is displayed. Examples of the trouble shooting to be displayed are "Please exchange battery of eyeglasses." and "Please adjust display state on control panel provided on backside of television.", as described above.

In response to receipt of the instruction, the display control section 14 stops supply of data to the display device 102 and brings the image display processing of the display device 102 into a waiting state, for example (Step S111). During the waiting period, the viewer executes the trouble shooting.

Meanwhile, in a case where the viewer does not perform trouble shooting with respect to any of the troubles by using the trouble information dialogue box 205, the viewer inputs an instruction indicating "no execution of trouble shooting" with respect to the trouble with the use of the operation device 103 ("NO" in Step S109).

In this case, in receipt of the instruction, the display control section 14 acquires the entire image data stored in the image data storage device 101 of the three-dimensional image display device 100 again, and supplies, as data for the sub-image, only the data for the left eye image contained in the initial sub-image data to the display device 102. Then, the display control section 14 controls the image display processing of the display device 102 so that the left eye image is displayed (Step S110).

Thus, the operation of the three-dimensional image output device 10 is finished.

As described above, according to the three-dimensional image output device 10, in a case where a sub-window is displayed inside a main window and where a three-dimensional image is displayed in the sub-window, a viewer is allowed to watch and compare the three-dimensional image and a two-dimensional image, thereby allowing the viewer to easily recognize a trouble with the three-dimensional image.

Consequently, an image having a three-dimensional effect suitable for a viewer can be outputted and displayed on a display device.

Embodiment 2

Figure 7:
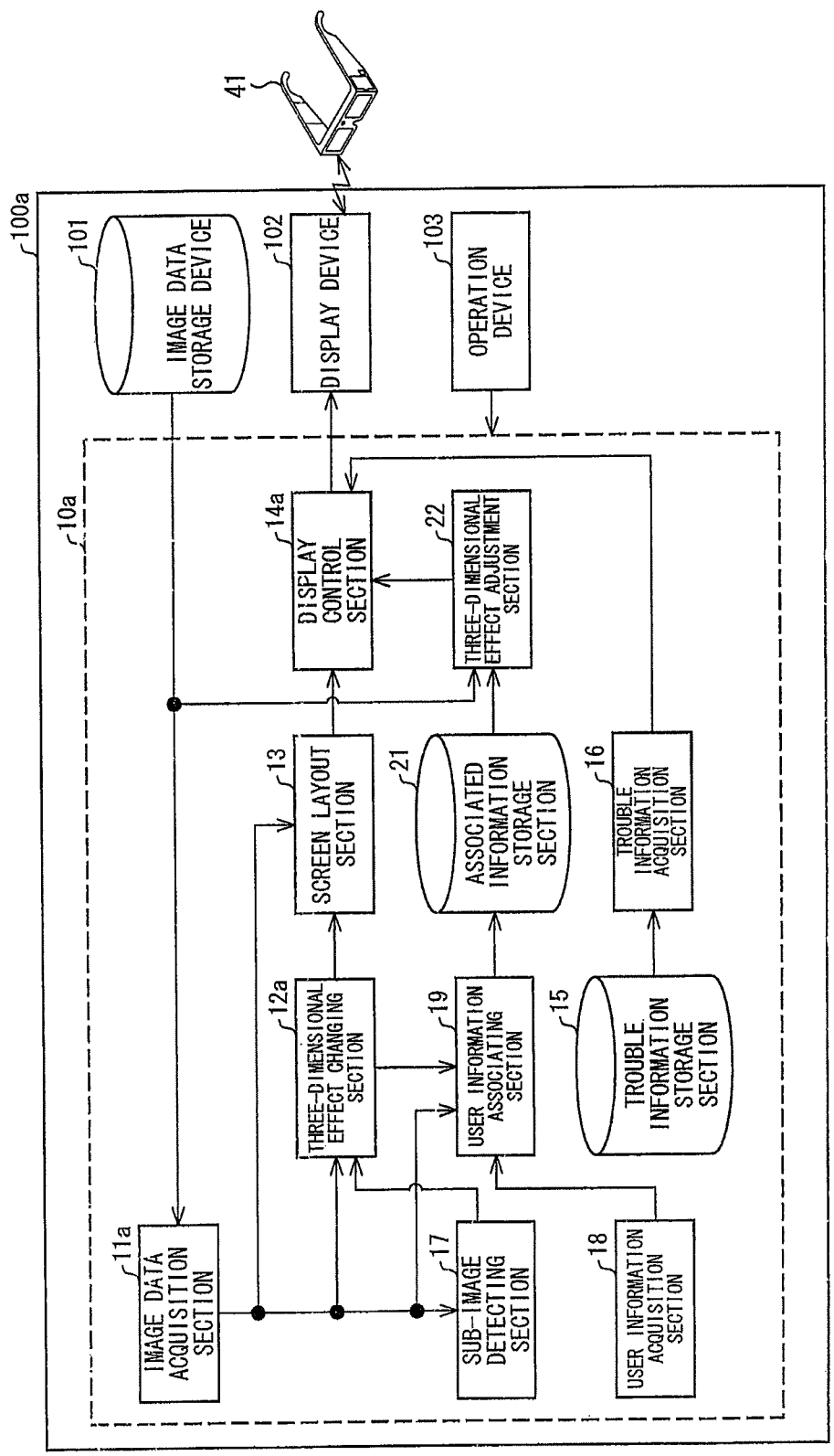
FIG. 7 is a block diagram illustrating an outline configuration of a three-dimensional image output device of another embodiment of the present invention.

Another embodiment of the present invention is described below with reference to FIGS. 7 through 14. Embodiment 2 of the present invention discusses an embodiment for allowing a viewer to easily adjust a three-dimensional effect of a three-dimensional image. FIG. 7 is a block diagram illustrating an outline configuration of a three-dimensional image output device 10a of Embodiment 2 of the present invention. As with the three-dimensional image output device 10 of Embodiment 1, the three-dimensional image output device 10a is mounted in a three-dimensional image display device 100a for displaying a three-dimensional image to a viewer, too. In the following description, members which are similar to those in Embodiment 1 are given identical reference numerals, and are not explained repeatedly.

The three-dimensional image output device 10*a* of Embodiment 2 of the present invention is different from the three-dimensional image output device 10 of Embodiment 1 in that the three-dimensional image output device 10*a* includes a user information acquisition section 18, a user information associating section (associating means) 19, an associated information storage section 21, and a three-dimensional effect adjustment section (three-dimensional effect adjustment means) 22. Further, the three-dimensional image output device 10*a* of Embodiment 2 of the present invention is different from the three-dimensional image output device 10 of Embodiment 1 in that the three-dimensional image output device 10*a* includes an image data acquisition section 11*a* in replacement of the image data acquisition section 11, includes a three-dimensional effect changing section 12*a* in replacement of the three-dimensional effect changing section 12, and includes a display control section 14*a* in replacement of the display control section 14.

(Three-Dimensional Image Output Device 10*a*)

As shown in FIG. 7, the image data acquisition section 11*a* is different from the image data acquisition section 11 of Embodiment 1 in that the image data acquisition section 11*a* supplies, also to the user information associating section 19, entire image data that is acquired from the image data storage device 101 of the three-dimensional image display device 100*a*. It is only necessary that the image data acquisition section 11*a* executes supply of the entire image data to the user information associating section 19 concurrently with supply of the entire image data to the three-dimensional effect changing section 12, the screen layout section 13, and the sub-image detecting section 17.

The three-dimensional effect changing section 12*a* is different from the three-dimensional effect changing section 12 of Embodiment 1 in that the three-dimensional effect changing section 12*a* supplies at least one secondary sub-image data also to the user information associating section 19. It is only necessary that the three-dimensional effect changing section 12*a* executes supply of the secondary sub-image data to the user information associating section 19 concurrently with supply of the secondary sub-image data to the screen layout section 13.

The user information acquisition section 18 acquires user information concerning a user (in this case, viewer). Examples of the user information include age, sex, occupation, income, and hobby of a viewer, and genre of an image which the viewer wants to watch.

The user information acquisition section 18 receives user information which is inputted by a viewer with the use of an operation device 103 for example. The display control section 14*a* is only required to display, on the screen of the display device 102, a dialogue box for allowing the viewer to input the user information, as described later. The user information acquisition section 18 supplies the user information thus acquired to the user information associating section 19.

The user information associating section 19 receives the user information from the user information acquisition section 18, receives the entire image data from the image data acquisition section 11*a*, and receives at least one secondary sub-image data from the three-dimensional effect changing section 12*a*.

Also in the present embodiment, a plurality of three-dimensional effects may be given to the initial sub-image data in advance, as in Embodiment 1. Accordingly, the user information associating section 19 receives, from the image data acquisition section 11*a*, a plurality of sub-image data which are initial sub-image data for which the respective plurality of three-dimensional effects are set. In this case, it is unnecessary for the three-dimensional effect changing section 12*a* to change the initial three-dimensional effect.

For example, a content maker can give some three-dimensional effect patterns to the initial sub-image data so that a three-dimensional effect suitable for a viewer can be selected.

The viewer selects his or her favorite image from among the initial three-dimensional sub-image and at least one secondary three-dimensional sub-image which are displayed on the screen of the display device 102, as described later. The user information associating section 19 associates a three-dimensional effect of a sub-image selected by the viewer with the user information received from the user information acquisition section 18. The user information associating section 19 causes associated information in which the three-dimensional effect and the user information are associated with each other to be stored in the associated information storage section 21.

As described above, a horizontal direction deviation amount d can be used as an indicator indicative of a three-dimensional effect of a sub-image. In a case where the horizontal direction deviation amount d is used, the user information associating section 19 associates a horizontal direction deviation amount d of a three-dimensional effect of a sub-image selected by a viewer with the user information, and causes associated information in which the horizontal direction deviation amount d is associated with the user information to be stored in the associated information storage section 21.

The associated information storage section 21 receives the associated information from the user information associating section 19 and stores the associated information thus received. The associated information storage section 21 stores the associated information in a list according to genre and age of viewers, for example. In this way, the associated information stored in the associated information storage section 21 can be efficiently referred to by the three-dimensional effect adjustment section 22.

The three-dimensional effect adjustment section 22 acquires the entire image data from the image data storage device 101, and adjusts the initial three-dimensional effect of the initial sub-image data contained in the entire image data. Specifically, for example when a viewer inputs his or her age or favorite genre with the use of the operation device 103, the three-dimensional effect adjustment section 22 refers to associated information stored in the associated information storage section 21 on the basis of the information thus inputted, and adjusts the initial three-dimensional effect.

In a case where the initial three-dimensional effect is an appropriate three-dimensional effect, the three-dimensional effect adjustment section 22 supplies the initial sub-image data to the display control section 14*a* without any adjustment. Meanwhile, in a case where the initial three-dimensional effect is not an appropriate three-dimensional effect, the three-dimensional effect adjustment section 22 adjusts the initial three-dimensional effect to an appropriate three-dimensional effect on the basis of the associated information. Then, the three-dimensional effect adjustment section 22 supplies, to the display control section 14*a*, the initial sub-image data having the three-dimensional effect thus adjusted.

The display control section 14*a* is different from the display control section 14 of Embodiment 1 in that the display control section 14*a* acquires, via the three-dimensional effect adjustment section 22, the entire image data stored in the image data storage device 101 of the three-dimensional image display device 100*a*. As described above, in a case where the three-dimensional effect adjustment section 22 supplies the initial sub-image data without any adjustment, the display control section 14*a* controls the image display processing of the display device 102 so that the initial three-dimensional sub-image using the initial three-dimensional effect is displayed.

Meanwhile, in a case where the three-dimensional effect adjustment section 22 supplies the initial sub-image data having an adjusted three-dimensional effect, the display control section 14*a* controls the image display processing of the display device 102 so that a three-dimensional image using the adjusted three-dimensional effect is displayed.

(Operation of Three-Dimensional Image Output Device 10*a*)

Figure 12:
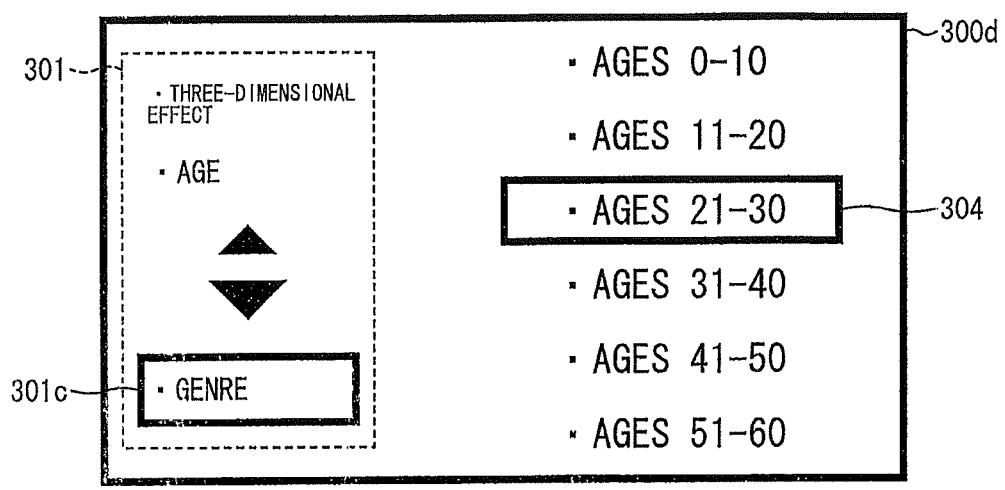
FIG. 12 is a diagram schematically explaining an operation of the three-dimensional image output device, and illustrates the screen of the display device.
Figure 13:
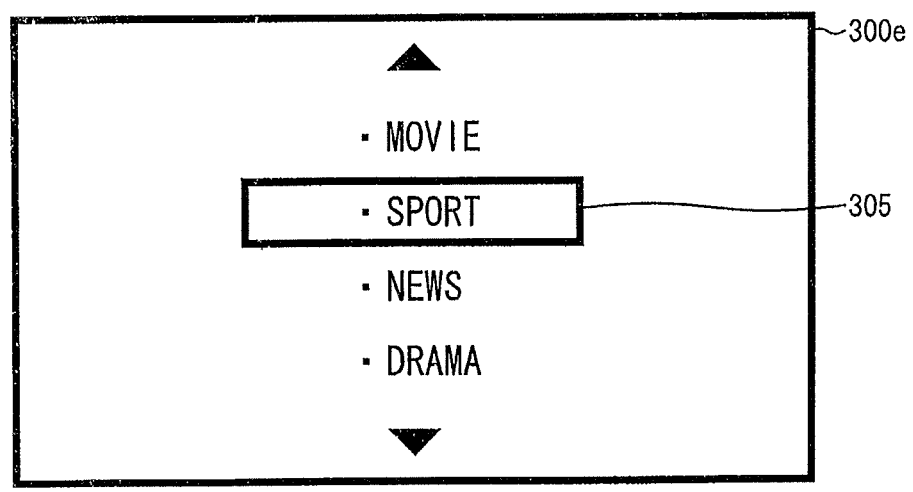
FIG. 13 is a diagram schematically explaining an operation of the three-dimensional image output device, and illustrates the screen of the display device.
Figure 14:
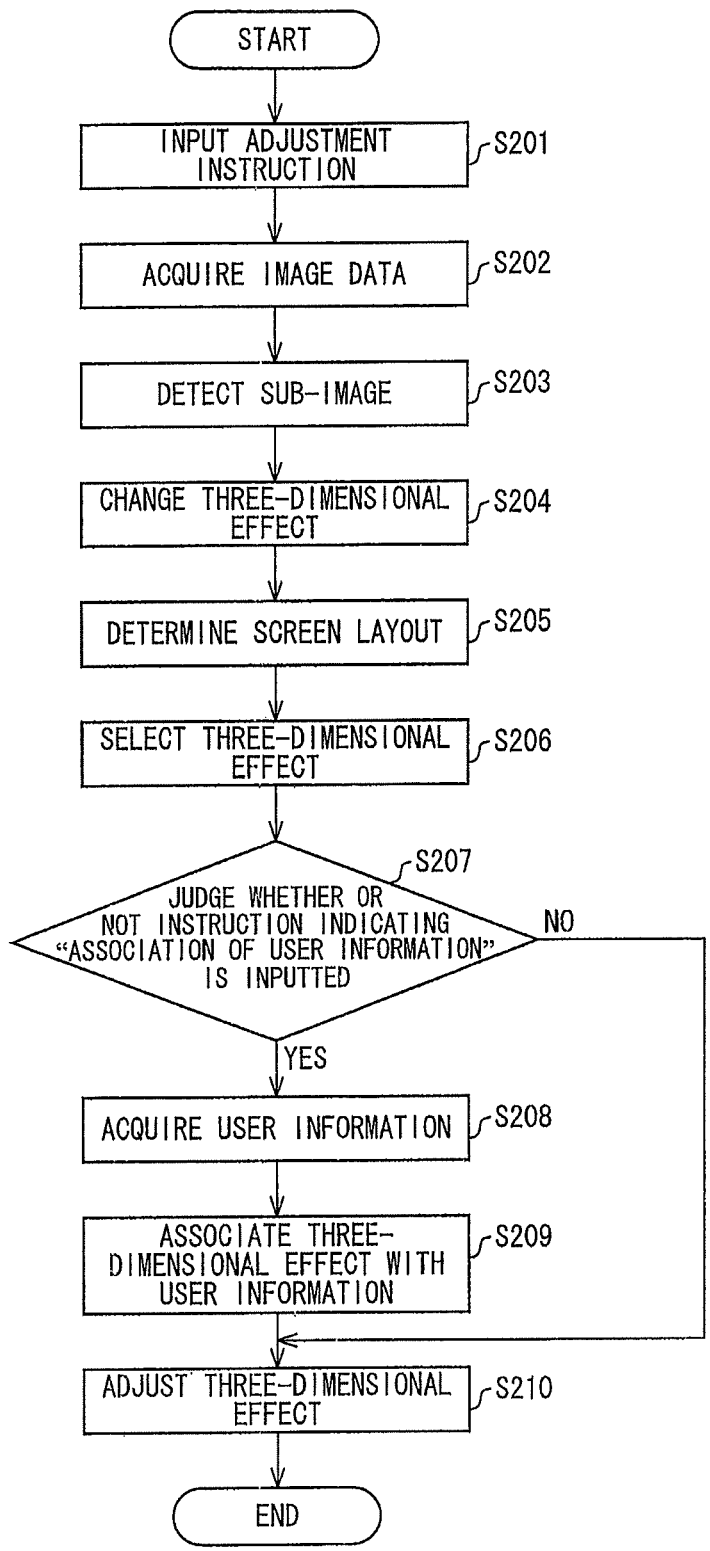
FIG. 14 is a flow chart showing an operation of the three-dimensional image output device.

Next, the following describes an operation of the three-dimensional image output device 10*a*, i.e., a processing procedure for the three-dimensional image output method with reference to FIGS. 8 through 14. FIGS. 8 through 13 are diagrams each schematically explaining the operation of the three-dimensional image output device 10*a* and each illustrating the screen of the display device 102. FIG. 14 is a flow chart showing the operation of the three-dimensional image output device 10*a*.

It is assumed that before the processes described below are carried out, the three-dimensional image output device 10*a* is outputting, to the display device 102 of the three-dimensional image display device 100*a*, the entire image data (containing initial sub-image data) stored in the image data storage device 101 without any change with the use of the display control section 14*a*, and a viewer is watching the initial three-dimensional sub-image displayed on the display device 102 through the shutter eyeglasses 41.

As shown in FIG. 14, first, the viewer who is watching the initial three-dimensional sub-image inputs an instruction to adjust a three-dimensional effect of the initial three-dimensional sub-image with the use of the operation device 103 of the three-dimensional image display device 100*a* (Step S201). In Step S201, the viewer may input the instruction at a timing when the viewer starts watching the sub-image with the use of the three-dimensional image display device 100*a*. Alternatively, the viewer may input the instruction anytime after start of viewing. In conclusion, the viewer may give the instruction when he or she thinks it necessary.

Next, when the instruction from the viewer is given via the operation device 103, the instruction is sent to the image data acquisition section 11*a* of the three-dimensional image output device 10*a*. In response to receipt of the instruction, the image data acquisition section 11*a* acquires the entire image data stored in the image data storage device 101 of the three-dimensional image display device 100*a* (Step S202).

In Step S202, the instruction is also sent to the display control section 14*a* at the same time. In response to receipt of the instruction, the display control section 14*a* stops outputting entire image data previously outputted to the display device 102. The display device 102 waits for new output from the display control section 14*a*, for example.

Further, the image data acquisition section 11*a* supplies the entire image data acquired from the image data storage device 101 to the three-dimensional effect changing section 12*a*, the screen layout section 13, the user information associating section 19, and the sub-image detecting section 17.

Next, after receiving the entire image data from the image data acquisition section 11*a*, the sub-image detecting section 17 detects the initial sub-image data contained in the entire image data (Step S203). The sub-image detecting section 17 supplies a result of the detection to the three-dimensional effect changing section 12*a*.

Next, the three-dimensional effect changing section 12*a* receives the entire image data from the image data acquisition section 11*a*, and receives the result of the sub-image detection from the sub-image detecting section 17. Then, the three-dimensional effect changing section 12*a* identifies the initial sub-image data contained in the entire image data on the basis of the result of the sub-image detection, and detects and changes a three-dimensional effect (initial three-dimensional effect) given to the initial sub-image data (Step S204).

In Step S204, the three-dimensional effect is, for example, expressed by the above-mentioned indicator, i.e., a horizontal direction deviation amount d. The three-dimensional effect changing section 12*a* detects a horizontal direction deviation amount d of the initial three-dimensional effect of the initial sub-image data, and increases or decreases the horizontal direction deviation amount d of the initial three-dimensional effect by a predetermined change amount.

The three-dimensional effect changing section 12*a* thus changes the initial three-dimensional effect to a secondary three-dimensional effect, and then supplies at least one secondary sub-image data having the secondary three-dimensional effect to the screen layout section 13.

Next, the screen layout section 13 receives the entire image data (containing initial sub-image data) from the image data acquisition section 11*a*, and receives the at least one secondary sub-image data from the three-dimensional effect changing section 12*a*. After receiving the initial sub-image data and the at least one secondary sub-image data, the screen layout section 13 determines how a plurality of sub-images which respectively utilize the initial sub-image data and the at least one secondary sub-image data and which have different three-dimensional effects are disposed on the screen of the display device 102 of the three-dimensional image display device 100*a* (Step S205). Note that the screen layout section 13 supplies, to the display control section 14*a*, the data for the main image contained in the entire image data as it is.

In Step S205, the screen layout section 13 determines how the initial three-dimensional sub-image and at least one secondary three-dimensional sub-image are disposed on the screen of the display device 102, i.e., determines positions and sizes (in vertical and horizontal directions) of the initial three-dimensional sub-image and the at least one secondary three-dimensional sub-image.

As described above, in the three-dimensional image technique utilizing the binocular parallax, it is preferable that a plurality of three-dimensional images having different three-dimensional effects are the same in horizontal position and horizontal length. This allows the viewer to easily recognize a difference in three-dimensional effect among the plurality of sub-images including the initial three-dimensional sub-image. For example, as shown in FIG. 9, sub-images 302 and 303 having different three-dimensional effects (respectively having a three-dimensional effect 3 and a three-dimensional effect 4, in this case) can be displayed on a region 300*a* which is a part of the screen of the display device 102.

Figure 8:
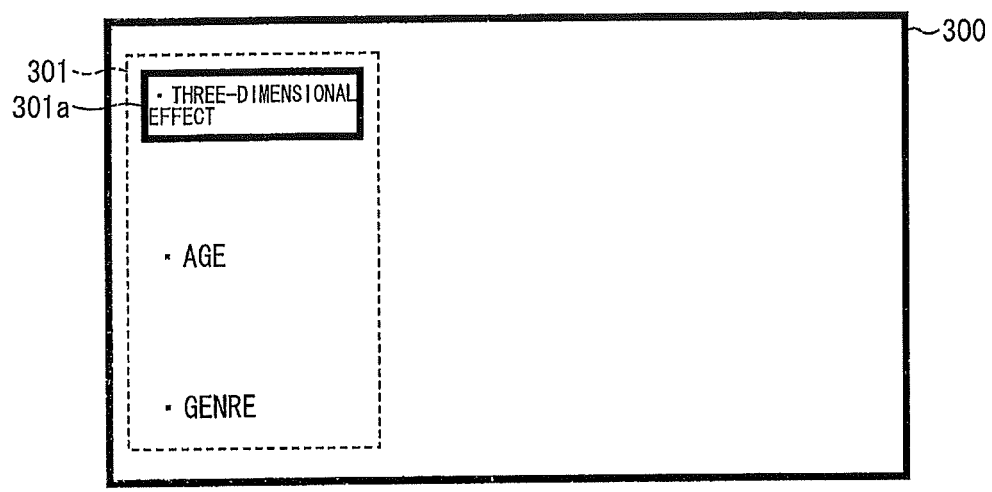
FIG. 8 is a diagram schematically explaining an operation of the three-dimensional image output device, and illustrates a screen of a display device.

Further, as shown in FIG. 8, the screen layout section 13 may not only determine the positions and the sizes of the two sub-images in the region 300, but also determine position and size of a question dialogue box 301 for inquiring of the viewer which of the plurality of sub-images should be selected. The question dialogue box 301 is a dialogue box in which the viewer inputs user information with the use of the operation device 103. The question dialogue box 301 is displayed in the region 300 or 300*a* which is a part of the screen of the display device 102 along with the plurality of three-dimensional images.

Figure 9:
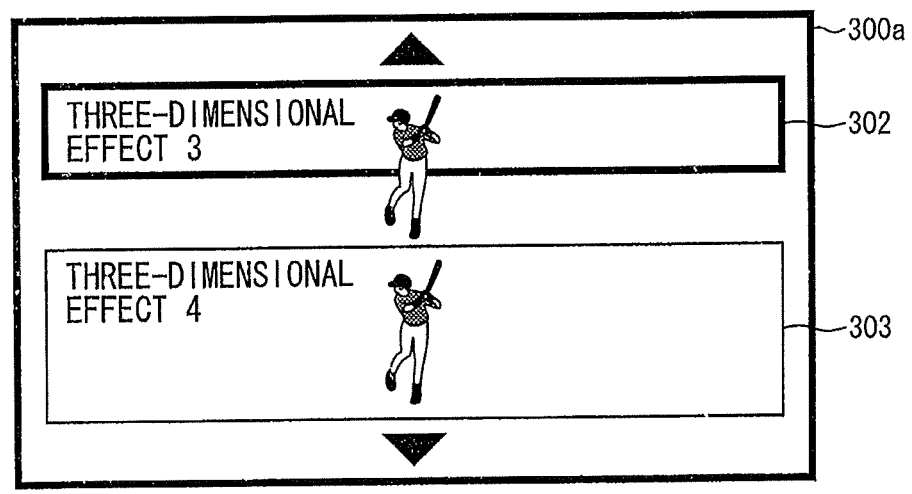
FIG. 9 is a diagram schematically explaining an operation of the three-dimensional image output device, and illustrates the screen of the display device.

The screen layout section 13 supplies, to the display control section 14*a*, screen layout information indicative of the screen layout as shown in FIGS. 8 and 9 along with the entire image data (containing the initial sub-image data) and at least one secondary sub-image data.

Next, the display control section 14*a* controls the image display processing of the display device 102 so that the plurality of secondary three-dimensional sub-images including the initial three-dimensional sub-image are displayed concurrently in accordance with the screen layout, indicated by the screen layout information which is received from the screen layout section 13. The viewer views the region 300*a* (see FIG. 9) and compares the plurality of sub-images 302 and 303. It is needless to say that although only the two sub-images 302 and 303 are shown in FIG. 9, the other secondary three-dimensional sub-images can be viewed by moving a display content shown in the region 300*a* upward and downward. Of course, it is also possible that the number of images displayed in the region 300*a* be increased.

By comparing the plurality of sub-images, the viewer judges and selects a sub-image suitable for him or her, i.e., his or her favorite sub-image (Step S206).

In Step S206, for example in a case where the viewer inputs an instruction "three-dimensional effect" 301*a* in the question dialogue box 301 in FIG. 8, the display control section 14*a* receives the instruction, and controls the image display processing of the display device 102 so that the plurality of sub-images including the initial three-dimensional sub-image are displayed.

In the conventional arts, a viewer can watch only an initial three-dimensional sub-image, and therefore it is difficult for the viewer to judge whether or not the initial three-dimensional sub-image is a sub-image having his or her favorite three-dimensional effect.

In contrast, according to the three-dimensional image output device 10*a*, a viewer can compare an initial three-dimensional sub-image and a secondary three-dimensional sub-image which uses a three-dimensional effect different from that of the initial three-dimensional sub-image as described above, and therefore can select his or her favorite sub-image. Thus, a sub-image using an appropriate three-dimensional effect can be outputted. Consequently, the viewer can watch the sub-image using the appropriate three-dimensional effect.

Next, for example in a case where the viewer selects the three-dimensional image 302 having the "three-dimensional effect 3" of FIG. 9 and inputs an instruction indicating "no association with user information" in the question dialogue box 301 in a region 300*b* of FIG. 10 ("NO" in Step S207), the process in Step S210 (described later) is carried out.

Meanwhile, in a case where the viewer inputs an instruction indicating "association with user information" in the question dialogue box 301 ("YES" in Step S207), the user information acquisition section 18 receives user information which is inputted by the viewer with the use of the operation device 103 (Step S208).

Figure 10:
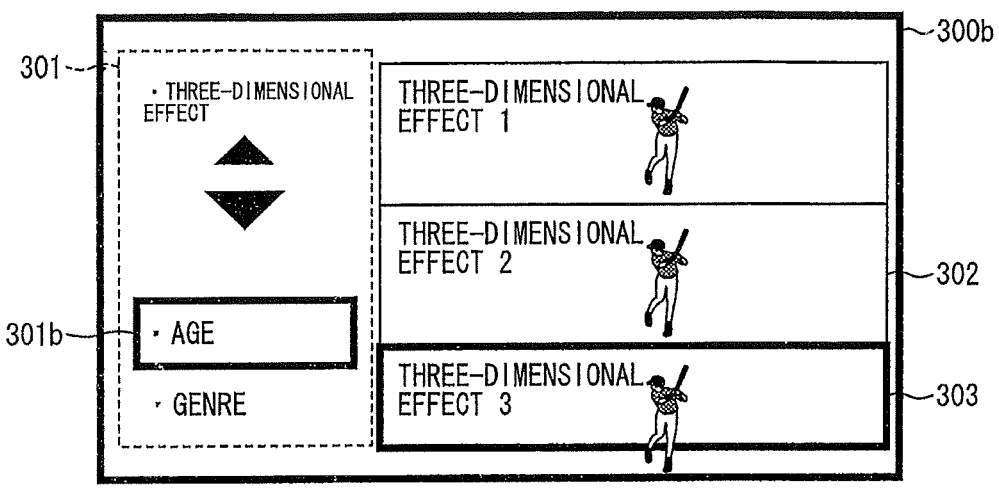
FIG. 10 is a diagram schematically explaining an operation of the three-dimensional image output device, and illustrates the screen of the display device.
Figure 11:
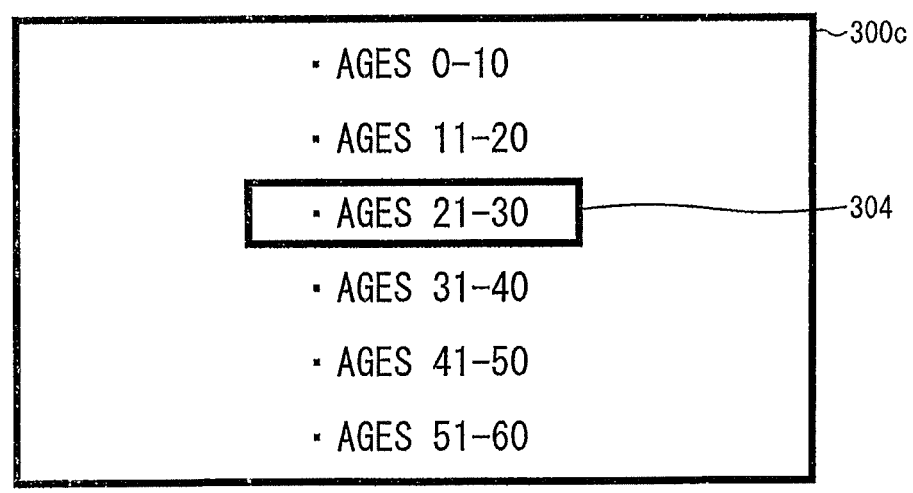
FIG. 11 is a diagram schematically explaining an operation of the three-dimensional image output device, and illustrates the screen of the display device.

In Step S208, for example in a case where the viewer inputs an instruction "age" 301*b* in the question dialogue box 301 in FIG. 10, the display control section 14*a* receives the instruction and controls the image display processing of the display device 102 so that a plurality of age groups are displayed (see a region 300*c* of FIG. 11, for example). The viewer inputs an age group (in this case, "ages 21-30" 304) including his or her age with the use of the operation device 103 as shown in FIG. 11.

Then, for example in a case where the viewer inputs an instruction "genre" 301*c* in the question dialogue box 301 in a region 300*d* of FIG. 12, the display control section 14*a* receives the instruction and controls the image display processing of the display device 102 so that a plurality of genres are displayed (see a region 300*e* of FIG. 13, for example). The viewer inputs his or her favorite genre (in this case, "sport" 305) with the use of the operation device 103 as shown in FIG. 13.

The user information associating section 19 receives the instruction of sub-image selection by the viewer in Step S206. The user information associating section 19 associates the user information supplied from the user information acquisition section 18 with a three-dimensional effect of a three-dimensional image selected by the viewer (Step S209). In Step S209, the user information associating section 19 causes associated information in which the three-dimensional effect and the user information are thus associated with each other to be stored in the associated information storage section 21.

Thus, the three-dimensional image output device 10*a* associates the user information supplied from the user information acquisition section 18 with a three-dimensional effect selected by the viewer every time the viewer watches a sub-image on the three-dimensional image display device 100*a*, and causes a large number of pieces of user information to be stored in the associated information storage section 21.

As a result, for example in a case where a viewer watches a sub-image, the three-dimensional effect adjustment section 22 executes the following process in Step S210. Specifically, in Step S210, the three-dimensional effect adjustment section 22 acquires entire image data (containing initial sub-image data) from the image data storage device 101, and adjust an initial three-dimensional effect of the initial sub-image data.

In a case where the initial three-dimensional effect is an appropriate three-dimensional effect, the three-dimensional effect adjustment section 22 supplies, to the display control section 14*a*, the initial sub-image data without any adjustment which initial sub-image data is contained in the entire image data. Meanwhile, in a case where the initial three-dimensional effect is not an appropriate three-dimensional effect, the three-dimensional effect adjustment section 22 adjusts the initial three-dimensional effect to an appropriate three-dimensional effect on the basis of the associated information. Then, the three-dimensional effect adjustment section 22 supplies, to the display control section 14*a*, initial sub-image data having the three-dimensional effect thus adjusted along with the data for the main image.

In a case where the three-dimensional effect adjustment section 22 supplies the initial sub-image data without any adjustment, the display control section 14*a* controls the image display processing of the display device 102 so that the initial three-dimensional sub-image using the initial three-dimensional effect is displayed.

Meanwhile, in a case where the three-dimensional effect adjustment section 22 supplies the secondary sub-image data having the adjusted three-dimensional effect, the display control section 14*a* controls the image display processing of the display device 102 so that a secondary three-dimensional sub-image using the adjusted three-dimensional effect is displayed.

Thus, the operation of the three-dimensional image output device 10*a* is finished.

As described above, the three-dimensional image output device 10*a* allows a viewer to watch and compare a plurality of sub-images having different three-dimensional effects so that the viewer can selects his or her favorite sub-image.

Further, the three-dimensional image output device 10a associates the three-dimensional effect of the sub-image selected by the viewer with user information of the viewer, and stores associated information thus acquired.

Accordingly, when a viewer watches a sub-image, an image having a three-dimensional effect suitable for the viewer can be outputted with reference to the associated information and displayed on a display device.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the three-dimensional image output devices 10 and 10a (excluding the trouble information storage section 15 and the associated information storage section 21) may be realized by way of hardware or software as executed by a CPU as follows:

The three-dimensional image output devices 10 and 10a each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the three-dimensional image output devices 10 and 10a a computer-readable storage medium containing control program code (executable program, intermediate code program, or source program) for the three-dimensional image output devices 10 and 10a, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The three-dimensional image output devices 10 and 10a may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which the program code is embodied electronically.

The present invention can be also expressed as follows. Specifically, the present invention is a three-dimensional image output device for outputting a three-dimensional image, which includes image output means for outputting a first image and a second image having a smaller screen size than the first image concurrently, and image adjustment means for adjusting a three-dimensional effect of the second image separately from a three-dimensional effect set for the first image.

It is preferable that the three-dimensional image output device further includes: three-dimensional effect changing means for increasing or decreasing an initial three-dimensional effect which is set for the initial sub-image data in advance so as to change the initial three-dimensional effect to a secondary three-dimensional effect, the display control means supplying, to the display screen, the initial sub-image data and secondary sub-image data which is the initial sub-image data for which the secondary three-dimensional effect is set so that an initial three-dimensional sub-image using the initial sub-image data and a secondary three-dimensional sub-image using the secondary sub-image data are displayed on the display screen.

In this case, the initial three-dimensional effect given to the initial sub-image data is changed to secondary three-dimensional effect, and the initial sub-image data to which the initial three-dimensional effect is given and at least one secondary sub-image data to which the secondary three-dimensional effect is given are supplied to the display screen. The initial sub-image data and the secondary sub-image data are different only in three-dimensional effect, and have the same content.

Thus, the initial three-dimensional sub-image using the initial sub-image data and a secondary three-dimensional sub-image using the secondary sub-image data can be displayed on the display screen.

Accordingly, a viewer who is watching the display screen can watch and compare sub-images, such as the initial three-dimensional sub-image and the secondary three-dimensional sub-image, which have different three-dimensional effects.

Consequently, in a case where a small window is displayed inside a window and a three-dimensional image is displayed in the small window, a viewer is allowed to watch and compare sub-images using different three-dimensional effects so that a sub-image using an appropriate three-dimensional effect can be outputted.

It is preferable that the initial sub-image data is created by using binocular parallax, and the initial three-dimensional sub-image and the secondary three-dimensional sub-image are displayed so as to be adjacent in a vertical direction on the display screen while a viewer is watching the display screen.

In a case where a three-dimensional image technique utilizing binocular parallax is used, it is preferable that the initial three-dimensional sub-image and the secondary three-dimensional sub-image are the same in horizontal position. "Same in horizontal position" means that the initial three-dimensional image and the two-dimensional image are displayed so as to be adjacent in a vertical direction on the display screen which the viewer is watching.

In this case, the viewer can easily recognize a difference in three-dimensional effect between the initial three-dimensional sub-image and the secondary three-dimensional sub-image.

It is preferable that the three-dimensional effect changing means changes the initial three-dimensional effect so that the secondary three-dimensional sub-image becomes a two-dimensional image.

In this case, the viewer can more easily recognize a difference in three-dimensional effect between the initial three-dimensional sub-image and the two-dimensional image which is the secondary three-dimensional sub-image.

It is preferable that the three-dimensional image output device further includes: a trouble information storage section which stores, in advance, trouble information concerning a trouble that is expected to occur while a viewer is watching a three-dimensional image; and trouble information acquisition means for acquiring the trouble information from the trouble information storage section in a case where the viewer who is watching the initial three-dimensional sub-image and the secondary three-dimensional sub-image which are displayed on the display screen inputs an instruction indicating that there is a trouble with viewing, the display control means further supplying, to the display screen, the trouble information acquired by the trouble information acquisition means so that the trouble information is displayed on the display screen.

In this case, the viewer can see the trouble information displayed on the display screen, and therefore can judge whether or not an action should be taken against the trouble.

For example, an action which should be taken by the viewer to solve the displayed trouble, i.e., trouble shooting may be displayed along with the trouble information. This allows the viewer to know the action which should be taken and more correctly judge whether or not the action should be taken.

It is preferable that the three-dimensional image output device further includes: associating means for, when the viewer who is watching the initial three-dimensional sub-image and the secondary three-dimensional sub-image which are displayed on the display screen inputs an instruction to select either the initial three-dimensional sub-image or the secondary three-dimensional sub-image, associating a three-dimensional effect of a three-dimensional sub-image thus selected by the viewer with information concerning the viewer; and an associated information storage section which stores, as associated information, the three-dimensional effect of the three-dimensional sub-image selected by the viewer and the information concerning the viewer which are associated by the associating means.

In this case, in a case where a viewer watches a sub-image which is a three-dimensional image, a three-dimensional effect can be adjusted to one suitable for the viewer with reference to associated information stored in the associated information storage section. For example, a three-dimensional effect can be adjusted to one suitable for a viewer on the basis of information such as age and sex of the viewer and three-dimensional effects associated with information on the viewer and information on the other viewers.

It is preferable that the three-dimensional image output device further includes three-dimensional effect adjustment means for, when the initial sub-image data is inputted, adjusting the initial three-dimensional sub-image on the basis of the associated information stored in the associated information storage section.

In this case, a three-dimensional effect can be adjusted with the use of the three-dimensional effect adjustment means.

It is preferable that a plurality of three-dimensional effects are set for the initial sub-image data in advance.

In this case, the plurality of sub-image data to which the respective plurality of three-dimensional effects given in advance to the initial sub-image data are given are supplied to the display screen. The plurality of sub-image data are different only in three-dimensional effect, and have the same content.

Thus, a plurality of three-dimensional sub-images using the respective sub-image data can be displayed on the display screen.

This allows a viewer who is watching the display screen to watch and compare the plurality of three-dimensional sub-images having the different three-dimensional effects.

Accordingly, a viewer is allowed to watch and compare sub-images using different three-dimensional effects so that a sub-image using an appropriate three-dimensional effect can be outputted.

It is preferable that the initial sub-image data is created by using binocular parallax, and the plurality of sub-image data are displayed so as to be adjacent in a vertical direction on the display screen while the viewer is watching the display screen.

In a case where a three-dimensional image technique utilizing binocular parallax is used, it is preferable that the plurality of three-dimensional images are the same in horizontal position. "Same in horizontal position" means that the plurality of three-dimensional images are displayed so as to be adjacent in a vertical direction on the display screen which the viewer is watching.

In this case, the viewer can easily recognize a difference in three-dimensional effect among the plurality of three-dimensional sub-images.

It is preferable that the plurality of three-dimensional sub-images include a two-dimensional image.

In this case, the viewer can more easily recognize a difference in three-dimensional effect between the three-dimensional sub-image and the two-dimensional image.

It is preferable that the three-dimensional image output device further includes: a trouble information storage section which stores, in advance, trouble information concerning a trouble which is expected to occur while a viewer is watching a three-dimensional image; and trouble information acquisition means for acquiring the trouble information from the trouble information storage section in a case where the viewer who is watching the plurality of three-dimensional sub-images which are displayed on the display screen inputs an instruction indicating that there is a trouble with viewing, the display control means further supplying, to the display screen, the trouble information acquired by the trouble information acquisition means so that the trouble information is displayed on the display screen.

In this case, the viewer can see the trouble information displayed on the display screen, and therefore can judge whether or not an action should be taken against the trouble.

For example, an action which should be taken by the viewer to solve the displayed trouble, i.e., trouble shooting may be displayed along with the trouble information. This allows the viewer to know the action which should be taken and more correctly judge whether or not the action should be, taken.

It is preferable that the three-dimensional image output device further includes: associating means for, when the viewer who is watching the plurality of three-dimensional sub-images which are displayed on the display screen inputs an instruction to select one of the plurality of three-dimensional sub-images, associating a three-dimensional effect of a three-dimensional sub-image thus selected by the viewer with information concerning the viewer; and an associated information storage section which stores, as associated information, the three-dimensional effect of the three-dimensional sub-image selected by the viewer and the information concerning the viewer which are associated by the associating means.

In this case, in a case where a viewer watches a sub-image which is a three-dimensional image, a three-dimensional effect can be adjusted to one suitable for the viewer with reference to associated information stored in the associated information storage section. For example, a three-dimensional effect can be adjusted to one suitable for a viewer on the basis of information such as age and sex of the viewer and three-dimensional effects associated with information on the viewer and information on the other viewers.

It is preferable that the three-dimensional image output device further includes three-dimensional effect adjustment means for, when the initial sub-image data is inputted, adjusting the three-dimensional sub-image using the initial sub-image data on the basis of the associated information stored in the associated information storage section.

In this case, a three-dimensional effect can be adjusted with the use of the three-dimensional effect adjustment means.

It is preferable that the three-dimensional image output device further includes sub-image detecting means for detecting the initial sub-image data contained in the image data.

The image data contains data for a main image to be displayed in the main window and data for a sub-image (initial sub-image data) to be displayed in the sub-window. The data for the main image and the initial sub-image data that are contained in the entire image data are generally given different identifiers, for example.

The sub-image detecting means can detect the initial sub-image data contained in the entire image data on the basis of such an identifier.

It is preferable that in a case where the plurality of three-dimensional sub-images are displayed on the display screen, the display control means causes the plurality of three-dimensional sub-images to be displayed so that each of the plurality of three-dimensional sub-images has same size as that during actual viewing.

A three-dimensional effect which the viewer feels changes as the size of a three-dimensional sub-image changes. In the above case, each of the plurality of three-dimensional sub-images is displayed so as to have the same size as that during actual viewing. This allows the viewer to select more appropriate three-dimensional effect.

It is preferable that the three-dimensional image output device further includes an image data storage section which stores the image data.

In this case, the image data can be stored.

It is preferable that a three-dimensional image display device of the present invention includes the three-dimensional image output device; and a display device to which the plurality of sub-image data are supplied, the display device having a display screen on which a plurality of three-dimensional sub-images using the respective plurality of sub-image data are displayed.

Thus, it is possible to provide a three-dimensional image display device including the three-dimensional image output device.

A recording medium of the present invention is a computer readable recording medium in which the image data used in the three-dimensional image output device is stored.

The recording medium stores the image data used in the three-dimensional image output device. The three-dimensional image output device can output a three-dimensional image with the use of the image data stored in the recording medium.

The three-dimensional image output device may be realized by a computer. In this case, the scope of the present invention encompasses (i) a control program for causing a computer to function as each means of the three-dimensional image output device so that the three-dimensional image output device can be realized by the computer and (ii) a computer readable recording medium in which the control program is stored.

INDUSTRIAL APPLICABILITY

The present invention is suitable for (i) a three-dimensional image output device which achieves viewing of a three-dimensional image by separately displaying a right eye image and a left eye image, each of which is an image exclusively used for three-dimensional viewing, so that the right eye image is observed only by a right eye of a viewer and the left eye image is observed only by a left eye of the viewer, and (ii) a three-dimensional image display device using the three-dimensional image output device.

REFERENCE SIGNS LIST

10, 10a: Three-dimensional image output device
11, 11a: Image data acquisition section
12, 12a: Three-dimensional effect changing section (three-dimensional effect changing means)
13: Screen layout section
14, 14a: Display control section (display control means)
15: Trouble information storage section
16: Trouble information acquisition section (trouble information acquisition means)
17: Sub-image detecting section (sub-image detecting means)
18: User information acquisition section
19: User information associating section (associating means)
21: Associated information storage section
22: Three-dimensional effect adjustment section (three-dimensional effect adjustment means)
41: Shutter eyeglasses
100, 100a: Three-dimensional image display device
101: Image data storage device (image data storage section)
102: Display device
103: Operation device

The invention claimed is:

1. A three-dimensional image output method for supplying image data to a display device so that one image is displayed in a main window and another image is displayed in a sub-window which is placed inside the main window on a display screen of the display device, comprising the steps of:
   a) by increasing or decreasing, by a predetermined change amount, an initial three-dimensional effect which is set in advance for initial sub-image data which is contained in the image data for displaying any three-dimensional image in the sub-window, changing the initial three-dimensional effect; and
   b) by supplying, to the display device, the initial sub-image data and secondary sub-image data for which the initial three-dimensional effect which has been changed in the step a) is set, displaying, on the display screen, an initial three-dimensional sub-image which is indicated by the initial sub-image data and a secondary three-dimensional sub-image which is indicated by the secondary sub-image data,
   the initial sub-image data being created by using binocular parallax,
   the initial three-dimensional sub-image and the secondary three-dimensional sub-image being displayed so as to be adjacent in a vertical direction on the display screen while a viewer is watching the display screen, and
   the step b) being carried out such that, in a case where an adjustment instruction based on a comparison between the initial three-dimensional sub-image and the secondary three-dimensional sub-image is inputted via a predetermined operation device, the initial sub-image data whose three-dimensional effect has been adjusted by using the initial three-dimensional effect which has been changed in the step a) is supplied to the display device.

* * * * *